United States Patent [19]
Okada et al.

[11] Patent Number: 6,062,025
[45] Date of Patent: May 16, 2000

[54] AUXILIARY BRAKE SYSTEM

[75] Inventors: Seiji Okada, Kawasaki; Takashi Takahashi, Tokyo, both of Japan

[73] Assignee: Mitsubishi Jidosha Kogyo Kabushiki Kaisha, Tokyo, Japan

[21] Appl. No.: 08/969,552

[22] Filed: Nov. 13, 1997

[30] Foreign Application Priority Data

Nov. 13, 1996 [JP] Japan ................................. 8-302147
Nov. 13, 1996 [JP] Japan ................................. 8-302148

[51] Int. Cl.⁷ ............................................... F02B 37/12
[52] U.S. Cl. ........................................ 60/602; 123/321
[58] Field of Search ............................. 60/602; 123/321

[56] References Cited

U.S. PATENT DOCUMENTS

| | | | |
|---|---|---|---|
| 4,395,884 | 8/1983 | Price | 60/602 |
| 4,932,372 | 6/1990 | Meneely | 123/182.1 |
| 5,119,633 | 6/1992 | Brooks et al. | 60/624 |
| 5,813,231 | 9/1998 | Faletti et al. | 60/602 |

*Primary Examiner*—Noah P. Kamen

[57] ABSTRACT

An auxiliary brake system includes a turbocharger, including an exhaust turbine driven by exhaust gas supplied from an internal combustion engine, nozzle vanes disposed therearound at intervals for a vane-opening-degree adjustment, and an actuator for adjusting the vane opening degree; a compression-releasing engine brake unit for generating an engine brake force by discharging suction air compressed in a combustion chamber of the engine at the timing in the vicinity of compression top dead center; and an electronic control unit. This control unit actuates the engine brake unit when the engine is in a fuel-cut region, and rotates the nozzle vanes through an actuator so that the opening degree of each nozzle vane is smaller than that attained when the engine brake unit is disabled and meets an engine rotation speed. As a result, when the engine brake unit is in operation, the rotation speed of the turbine of the turbocharger increases within a range where the turbine rotation speed does not exceed a rotation speed limit, so that the supercharging degree in the turbocharger increases, whereby an engine brake action of the engine brake unit is enhanced to produce a required engine brake force, while improving the durability of the turbocharger.

16 Claims, 11 Drawing Sheets

AUXILIARY BRAKE SYSTEM

BACKGROUND OF THE INVENTION

1. Field of the Invention

This invention relates to an auxiliary brake system, and more particularly, to an auxiliary brake system which enhances the braking ability of a compression-releasing engine brake unit by effectively utilizing a turbocharger having a supercharge-degree adjusting function.

2. Description of Related Art

Large-sized vehicles such as trucks and buses, which are heavy in weight and which produce a large inertial force during running, require a large braking force at the time of braking. In addition to an ordinary brake unit such as drum brake unit and disk brake unit, large-sized vehicles are generally equipped with an auxiliary brake system such as engine brake unit and exhaust brake unit.

A compression-releasing engine brake unit attached to an internal combustion engine operates to permit a piston to compress suction air, sucked into a combustion chamber of the engine, in a condition that fuel supply is interrupted, and to cause an exhaust valve to open to discharge the compressed air when the piston reaches the vicinity of top dead center in a compression stroke, whereby the compression work by the piston is absorbed to generate a braking force.

The braking ability of an engine brake unit of this type increases with the increase in an amount of suction air or the volumetric efficiency (charging efficiency). In this regard, it is considered that the suction air pressure (boost pressure) at the time when the engine brake unit is in operation may be increased by use of a turbocharger provided in an internal combustion engine and having a turbine and a compressor.

An engine brake unit disclosed in Japanese Unexamined Utility Model Publication No. 61-33933 utilizes a variable geometric turbocharger (hereinafter referred to as VG turbocharger) in which an inclination angle of nozzle vanes, disposed in a turbine nozzle section around turbine blades of the turbocharger, is variable in accordance with engine rotation speed. When the engine brake unit is in operation, the inclination angle of the nozzle vanes is decreased to reduce a nozzle opening area, thereby increasing an exhaust flow speed. As a result, the turbine and the compressor can rotate at high speeds, so that the charging efficiency (supercharging degree) increases, thereby increasing the engine brake force.

The VG turbocharger operates, while adjusting the supercharging degree, not only when the engine brake unit is in operation, but also when the engine operates in an ordinary state (especially, in an accelerated operation state) in which fuel is supplied while rendering the engine brake unit inoperative. The exhaust gas, discharged from a combustion chamber when the engine is driven and supplied with fuel, contains a combustion gas produced by combustion of fuel. Thus, an exhaust flow amount and exhaust pressure become quite large, so that the turbine rotation speed increases. From the viewpoint of preventing excessive rotation of the turbine, it is inappropriate to extensively decrease a nozzle opening area (nozzle-vane opening) for adjustment of the supercharging degree. That is, there is a restriction in decreasing the level of a low limit of the nozzle opening area. Although not specifically mentioned in the aforementioned U.M. publication, it is understood that the nozzle opening area at the time when the engine brake unit is in operation is adjusted to a value falling within a limited range which is determined taking into account the above restriction. In this case, a variable range within which the nozzle opening area or the supercharging degree varies during the operation of the engine brake unit is equivalent to the variable range employed at the time the engine brake unit is disabled.

When the engine brake unit is in operation, the compressed suction air is discharged without being subjected to combustion expansion or without a volumetric change. Thus, the supercharging degree and the turbine rotation speed do not increase, if the nozzle opening area varies within the limited range conforming to the case where the engine brake unit is disabled. Insufficient supercharging degree sometimes causes a problem of inadequate engine-braking-force enhancing effect of the turbocharger.

SUMMARY OF THE INVENTION

An object of the present invention is to provide an auxiliary brake system which effectively utilizes a supercharging-degree adjusting function of a turbocharger to permit a compression-releasing engine brake unit to generate an increased engine brake force, and which improves durability of the turbocharger.

An auxiliary brake system according to the present invention comprises: a turbocharger operable to variably adjust a supercharging degree; an engine brake unit for generating an engine brake force by discharging suction air, compressed in a combustion chamber of an internal combustion engine, at timing in the vicinity of compression top dead center of the internal combustion engine; and a controller for driving the turbocharger, when the engine brake unit is in operation, so as to permit the supercharging degree to become larger than that attained when the engine brake unit is disabled.

In regard to the auxiliary brake system of the present invention, when the engine brake unit is in operation, fuel supply is usually interrupted and hence the compressed air, accompanied by no combustion expansion, is discharged. Therefore, the exhaust flow amount and exhaust pressure become smaller than those observed when the engine brake unit is disabled with the engine supplied with fuel. On the other hand, during the operation of the engine brake unit, the supercharging degree in the turbocharger is intentionally enlarged compared to that given when the engine brake unit is disabled. As a result, the flow velocity of exhaust introduced into the turbine of the turbocharger increases, so that the turbine is permitted to rotate at a high speed even if the introduced exhaust is small in flow amount and low in pressure. Thus, the supercharging degree (i.e., enhancement degree of volumetric-efficiency) in the turbocharger increases, so that the compression-releasing engine brake unit can generate an increased engine brake force.

In the present invention, it is not essentially required to always cause the supercharging degree at the time when the engine brake unit is in operation to increase to the extent that the supercharging degree becomes larger than that given when the engine brake unit is disabled. That is, it is unnecessary to always cause the turbocharger to effect a supercharging-degree enhancement action during the operation of the engine brake unit. For example, the supercharging-degree enhancement action of the turbocharger may be selectively inhibited when the engine brake unit is in operation. In this case, the supercharging degree at the time of operation of the engine brake unit may be adjusted to become equal, e.g., to that given at the time of non-operation of the engine brake unit.

In the present invention, preferably, the turbocharger includes an exhaust turbine driven by exhaust gas discharged from the internal combustion engine; and an exhaust-introduction adjuster for variably adjusting a flow sectional area at an exhaust inlet of the exhaust turbine. When the engine brake unit is in operation, the controller operates the exhaust-introduction adjuster to permit the flow sectional area at the exhaust inlet to become smaller than that given when the engine brake unit is disabled.

According to this preferred embodiment, when the engine brake unit is in operation, the supercharging degree in the turbocharger can be increased by reducing the flow sectional area at the exhaust inlet of the exhaust turbine.

More preferably, the exhaust-introduction adjuster of the turbocharger includes nozzle vanes disposed around the exhaust turbine at intervals for a vane opening degree adjustment; and an actuator for adjusting opening degrees of the nozzle vanes. The exhaust-introduction adjuster is operable to adjust the opening degrees of the nozzle vanes to thereby change a total area of gaps each defined between adjacent ones of the nozzle vanes. When the engine brake unit is in operation, the controller drives the actuator to permit the opening degrees of the nozzle vanes to become smaller than that given when the engine brake unit is disabled.

According to this preferred embodiment, the auxiliary brake system of the present invention can be formed by using an existing variable geometric turbocharger. By making the vane opening degrees small when the engine brake unit is in operation, the flow sectional area at an exhaust inlet of the exhaust turbine can be reduced, whereby the supercharging degree in the turbocharger can be increased. Further, by decreasing the vane opening degrees, the turbocharger is enabled to serve as an exhaust brake to exhibit a braking effect.

Preferably, the auxiliary brake system further comprises engine rotation speed detecting means for detecting an engine rotation speed. The controller drives the turbocharger so as to decrease the supercharging degree, within a predetermined range, with increase in the engine rotation speed at the time when the engine brake unit is in operation. The predetermined range is determined such that the supercharging degree which varies within the predetermined range is permitted to have a value larger than an upper limit value of the supercharging degree attained at the time when the engine brake unit is disabled.

According to this preferred auxiliary brake system, the supercharging degree decreases within the predetermined range as the engine rotation speed increases and in its turn as the turbine rotation speed increases. This makes it possible to rotate the exhaust turbine at a rotation speed which does not exceed a rotation speed limit of the exhaust turbine, by decreasing the supercharging degree with the increase in the engine rotation speed, while obtaining an increased engine brake force by maintaining the supercharging degree preferably at a value larger than an upper limit value of the supercharging degree given at the time the engine brake unit is disabled. Thus, the durability of the turbocharger can be improved by securely preventing a failure of the turbocharger caused by excessive rotation of the exhaust turbine, while producing a required engine brake force.

In the just-mentioned preferred embodiment, more preferably, the controller drives the turbocharger so as to change the supercharging degree in a stepwise fashion within the predetermined range in accordance with the engine rotation speed at the time when the engine brake unit is in operation.

According to this preferred auxiliary brake system, while optimizing the degree of enhancement of engine brake force and preventing a failure of the turbocharger, the drive of the turbocharger by the controller for a supercharging degree adjustment can be simplified, as compared to a case of continuously changing the supercharging degree.

Preferably, the auxiliary brake system of the present invention further comprises engine load detecting means for detecting a load state of the internal combustion engine. The engine brake unit is rendered operative when the engine load detecting means detects that a load applied to the internal combustion engine is smaller than a predetermined load.

According to this preferred auxiliary brake system, the operation of the engine brake unit is started when the engine load drops below the predetermined load, e.g., when a decelerating operation of the engine accompanied by interruption of fuel supply (fuel-cut operation) is started in response to cancellation of depression of an accelerator pedal. As a result, the supercharging degree increases in response to a driver's intention of deceleration, whereby a required engine brake force can be produced with good response.

Preferably, the auxiliary brake system of the present invention further comprises a changeover switch adapted to be changed over between a first changeover position at which the turbocharger is allowed to effect a supercharging-degree enhancement action and a second changeover position in which the supercharging-degree enhancement action is prohibited. The controller is permitted to drive the turbocharger so as to increase the supercharging degree only when the changeover switch is at the first changeover position.

According to this preferred auxiliary brake system, the driver is enabled to selectively utilize the engine-brake-force enhancement effect achieved by the increase of the supercharging degree, by operating the changeover switch. That is, when the changeover switch is at the first changeover position, the supercharging degree in the turbocharger increases upon actuation of the engine brake unit, thereby generating a large engine brake force. On the other hand, when the changeover switch is at the second changeover position, the supercharging-degree enhancement action of the turbocharger is inhibited even if the engine brake unit is in operation, whereby an ordinary supercharging degree is attained. In this case, the flow velocity of exhaust introduced into the exhaust turbine and the turbine rotation speed become equal to their ordinary values. Consequently, no special increase in the turbine rotation speed takes place, so that the durability of the turbocharger is improved. The operation of the engine brake unit may be inhibited when the changeover switch is at the second changeover position.

Preferably, the auxiliary brake system of the present invention further comprises a changeover switch adapted to be changed over among a plurality of first changeover positions, respectively corresponding to different supercharging degrees, and a second changeover position. When any one of the plurality of the first changeover positions is selected by operating the changeover switch, the controller is operable to drive the turbocharger so that the supercharging degree becomes equal to a value corresponding to the selected first changeover position. The turbocharger is prevented from effecting the supercharging-degree enhancement action when the changeover switch is at the second changeover position.

According to this preferred auxiliary brake system, the driver can selectively utilize the engine-brake-force enhancement effect achieved by the increase of the supercharging degree, by operating the changeover switch. In the case of permitting the supercharging-degree enhancement action of the turbocharger, the supercharging degree can be set properly. That is, if any one of the first changeover positions is selected by the operation of the changeover switch, the supercharging degree, corresponding to the thus selected changeover position of the changeover switch, is achieved during the operation of the engine brake unit. As a result, the engine-brake-force enhancement effect by means of supercharging is exerted at a degree corresponding to the selected changeover position of the changeover switch, so as to produce an engine brake force which the driver expects. On the other hand, when the changeover switch is at the second changeover position, the supercharging-degree enhancement action of the turbocharger is inhibited so that the turbine rotation speed does not increase specially, thereby improving the durability of the turbocharger.

DETAILED DESCRIPTION

An auxiliary brake system according to a first embodiment of the present invention will be described with reference to the accompanying drawings.

Figure 1:
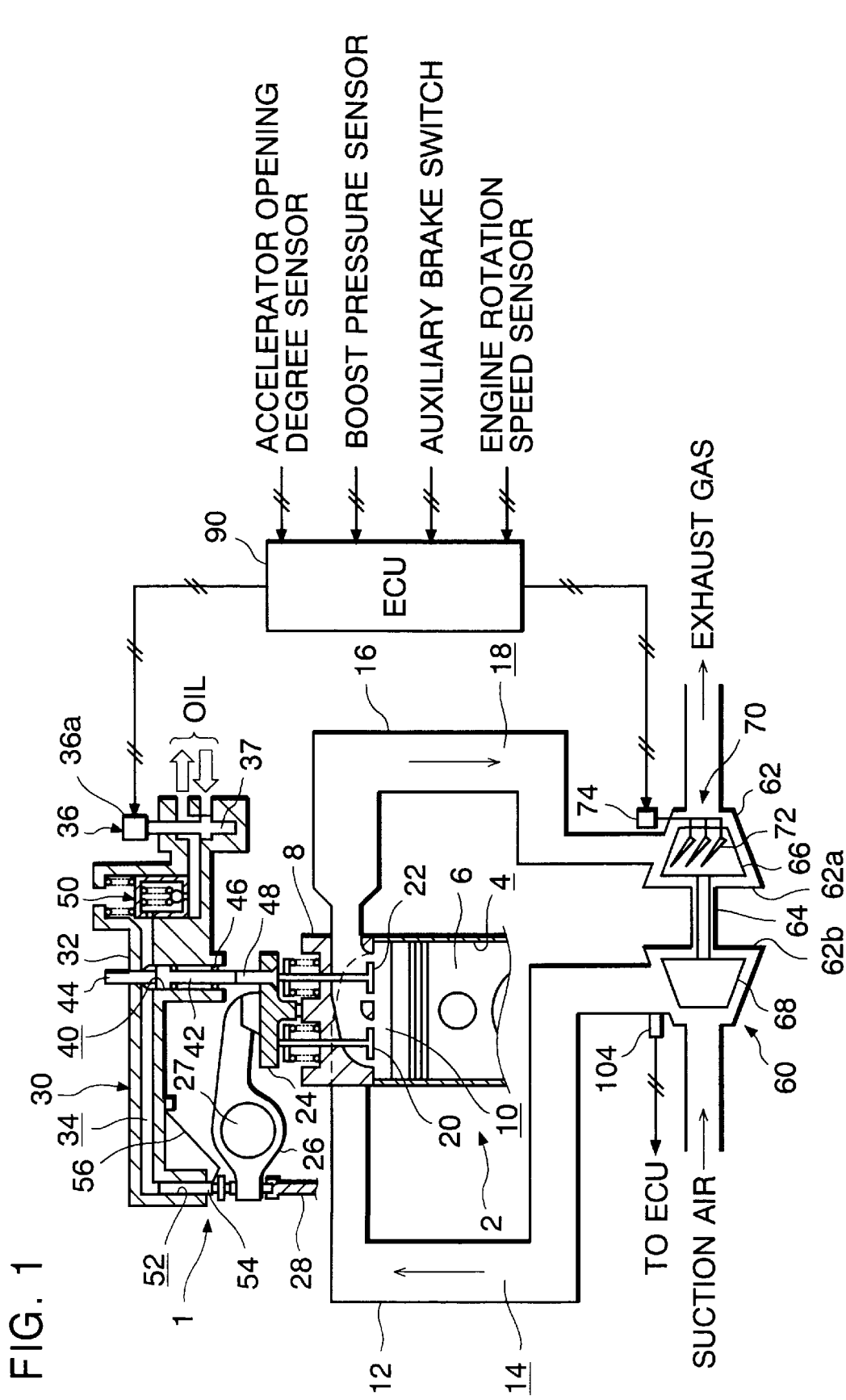
FIG. 1 is a schematic view of an automotive engine equipped with an auxiliary brake system according to a first embodiment of the present invention.

Referring to FIG. 1, an automotive OHV diesel engine (hereinafter referred to as engine) 1 to which an auxiliary brake system is attached includes an engine body 2 formed with a cylinder 4. A piston 6 received in the cylinder 4 for reciprocal motion cooperates with the cylinder 4 and a cylinder head 8 to define a combustion chamber 10. The cylinder head 8 has one side thereof connected to one end of an intake pipe 12. An intake air passage 14 defined by the intake pipe 12 is permitted to communicate with the combustion chamber 10 through an intake valve (not shown). An exhaust pipe 16 extends from another side of the cylinder head 8 away from the intake pipe 12. An exhaust passage defined by the exhaust pipe 16 is permitted to communicate with the combustion chamber 10 through a pair of exhaust valves 20 and 22. FIG. 1 shows the exhaust valves 20 and 22 in a state where they are closed. Unlike inaccurate illustration of FIG. 1, the exhaust valves 20 and 22 are in actual closely seated on an exhaust valve seats formed in the cylinder head 8, when they are closed.

A distal end of a valve stem of the exhaust valve 20 is in contact with a bottom face of a valve bridge 24 disposed above the exhaust valves 20 and 22. A distal end of a valve stem of the exhaust valve 22 is in contact with a bottom face of a push rod 48 which is movable in unison with the valve bridge 24. A rocker arm 26 is supported for swing motion by a rocker shaft 27. A distal end of the rocker arm 26 is in contact with a central part of an upper face of the valve bridge 24. A proximal end of the rocker arm 26 has a bottom face thereof disposed in contact with an upper end face of a push rod 28. A lower end face of the push rod 28 is in contact with the outer periphery of a cam (not shown) of a camshaft which rotates with rotation of a crank shaft (not shown) of the engine 1. As the push rod 28 reciprocates with the rotation of the crank shaft, the rocker arm 26 rocks around the rocker shaft 27 to thereby cause the exhaust valves 20 and 22 to be opened and closed through the valve bridge 24. Intake valves (not shown) are drivingly coupled to the camshaft through a rocker arm (not shown) and push rod (not shown) which are different from the rocker arm 26 and push rod 28, so that the intake valves are opened and closed with rotation of the camshaft concerned.

Although not shown in FIG. 1, a fuel injection valve is provided in the cylinder head 8 to face the combustion chamber 10. The fuel injection valve is connected to a fuel injection pump.

A compression-releasing engine brake unit 30 is provided at an upper part of the engine 1. The engine brake unit 30 operates to cause the piston to compress air sucked into the combustion chamber 10 in a condition that no fuel is supplied to the combustion chamber, so that the piston 6 performs a negative work. When the piston reaches the vicinity of top dead center in a compression stroke, the engine brake unit causes the exhaust valve 22 to open to discharge the compressed suction air from the combustion chamber, thereby absorbing the negative work and producing a braking force.

In this embodiment, the engine brake unit 30 is operated when a decelerated engine operation accompanied by interruption of fuel supply is carried out. Hereinafter, the just-mentioned engine operation is referred to as fuel cut or as a fuel-cut operation. Meanwhile, the engine brake unit 30 may be operated both at the time of fuel-cut operation and at the time of braking by means of depression of a brake pedal.

The compression-releasing engine brake unit 30 has a casing 32 thereof formed with an oil passage 34. The oil passage 34 is connected to a hydraulic unit (not shown)

through an electromagnetic spool valve 36 disposed at one end portion of the casing 32. The spool valve 36 has an electromagnetic solenoid 36a thereof connected to an electronic controller (ECU) 90. When supplied with a drive signal from the ECU, the solenoid 36a causes a spool 37 of the spool valve 36 to shift from an oil-discharge position shown in FIG. 1 to an oil-supply position. When the spool 37 is at the oil-supply position, pressurized oil is supplied to the oil passage 34 from the hydraulic unit. When the supply of drive signal to the electromagnetic solenoid 36a is stopped, the spool 37 is switched from the oil-supply position to the oil-discharge position, so that the pressurized oil in the oil passage 34 is discharged toward the hydraulic unit.

The casing 32 is formed at its central portion with a first cylinder section 40 extending perpendicular to the oil passage 34. A slave piston 42 is slidably disposed in the cylinder section 40. Reference numeral 44 denotes a guide pin for guiding the slave piston 42, and reference numeral 46 denotes a coil spring which urges the slave piston 42 toward an original position, shown in FIG. 1, of the slave piston.

A bottom end face of the slave piston 42 is in contact with an upper end face of the push rod 48. Therefore, when the slave piston 42 is pressed downward by the pressurized oil supplied to the oil passage 34 against an urging force of the coil spring 46, the push rod 48 moves downward to thereby open the exhaust valve 22.

When the piston 6 reaches the vicinity of compression top dead center during the fuel-cut operation, the ECU 90 supplies a drive signal to the electromagnetic solenoid 36a of the spool valve 36. In response to the drive signal, the spool 37 is switched to the oil-supply position as described above, so that the slave piston 42 is pressed by a pressure of the pressurized oil supplied to the oil passage 34 so that the exhaust valve 22 opens. Therefore, air compressed by the piston in the combustion chamber 10 is discharged to the exhaust passage 18, whereby the compression work is absorbed to produce an engine brake force.

A control valve 50 for adjusting the pressure of the pressurized oil in the oil passage 34 to a value below a predetermined pressure is provided in the oil passage 34 between the cylinder section 40 and the spool valve 36. The control valve 50 performs a pressure adjustment to prevent an internal pressure in the oil passage 34 from being excessive, to thereby prevent a failure of the engine brake unit 30. The structure of the control valve 50 is known, and hence a description thereof is omitted.

The oil passage 34 extends to another end, remote from the control valve 50, of the casing 32, and communicates with a second cylinder section 52 formed in that end of the casing 32. The cylinder section 52 accommodates therein a master piston 52a for slide motion. A distal end of the master piston 52 is in contact with an upper face of a proximal end portion of the rocker arm 26. The master piston 52 reciprocates in the cylinder 52 as the push rod 28 moves upward and downward. When the push rod 28 moves upward to thereby open the exhaust valves 20 and 22, the master piston 52a moves upward to press the slave piston 42 downward through oil in the oil passage 34, assisting a downward movement of the exhaust valve 22. In FIG. 1, reference numeral 56 denotes a flat spring which always urges the master spring 52a toward the rocker arm 26.

As shown in FIG. 1, a variable geometric turbocharger 60 is provided at an engine portion at which the intake pipe 12 and the exhaust pipe 16 are disposed adjacent to each other. Basically, like ordinary turbochargers, the VG turbocharger 60 comprises an exhaust turbine 66 and a compressor 68 which are disposed within the housing 62. These elements 66 and 68 are interconnected through a coupling shaft 64 with each other for synchronous rotation. When the turbine 66 is rotated by exhaust gas flowing through the exhaust passage 18 in the direction of the arrow in FIG. 1, the compressor 68 rotates synchronously with the rotation of the turbine, whereby air in the intake air passage 14 is compressed and supercharged to the combustion chamber 10.

The VG turbocharger 60 further comprises a nozzle unit 70 including movable nozzle vanes 72 disposed so as to surround the turbine 66. This nozzle unit 70 is drivingly connected to a nozzle actuator 74 which is electrically connected to the ECU 90.

Figure 2:
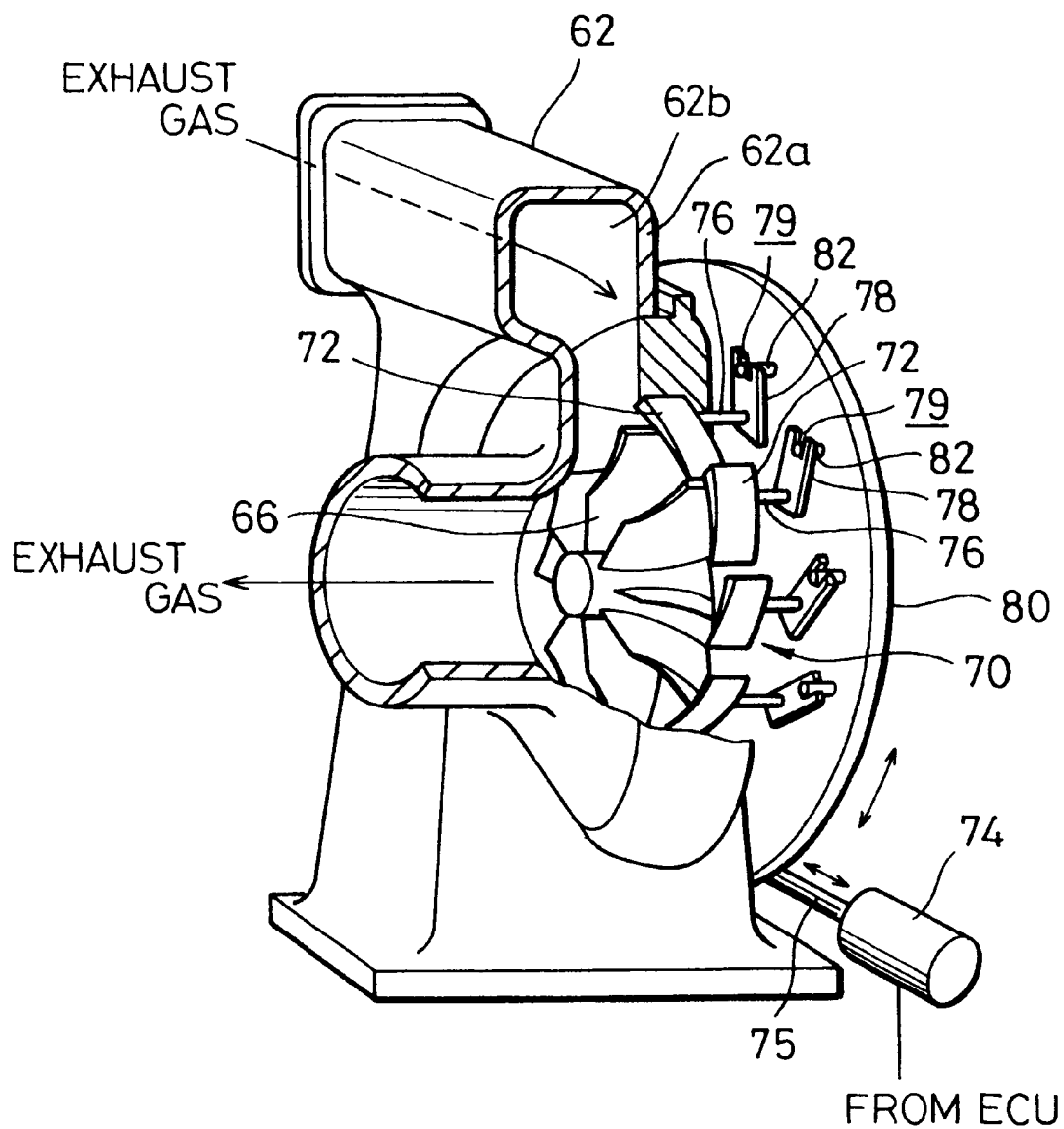
FIG. 2 is a perspective view showing, partly broken, with a housing portion away the details of the VG turbocharger shown in FIG. 1.

More specifically, as shown in FIG. 2, the movable vanes 72 are disposed at equal intervals in the circumferential direction along an outer periphery of the turbine 66. The movable vanes 72 extend through a turbine-side inner wall 62a of the housing 62, and are respectively connected to inner ends of pins 76 rotatably supported by the housing 62. Outer ends of the pins 76 are drivingly connected to a circle plate 80 through link members 78 and projections 82. Specifically, the circle plate 80 is disposed for rotation around the coupling shaft 64 between the turbine-side inner wall 62a and a compressor-side inner wall 62b of the housing 62. The projections 82 are disposed on an end face of the circle plate 80 on the side close to the exhaust turbine at the same intervals as the intervals at which the movable vanes are spaced. These projections 82 are slidably inserted into cutout portions 79 formed in respective one ends of the link members 78. The other ends of the link members 78 are connected to outer ends of the pins 76.

A rod 75 of the actuator 74 is connected to an end face of the circle plate 80 on the side remote from the turbine. When the level of the drive signal supplied from the ECU to the actuator 74 changes, the actuator 74 which is comprised, e.g., of a linear solenoid causes the rod 75 to move forward or backward to a rod position corresponding to a drive signal level. With this movement of the rod 75, the circle plate 80 rotates around the coupling shaft 64, to thereby press the link members 78 in the circumferential direction, while causing the projections 82 to slide in the cutout portions 79. As a result, the link members 78, pins 76 and movable vanes 72 rotate around the axes of the pins 76 through the same angle as the rotation angle of the circle plate 80. When the movable vanes 72 rotate in this manner, the vane opening degree θ VG (FIG. 4) of the movable vanes 72 changes, so that each gap (hereinafter referred to as vane gap) defined between adjacent movable vanes changes. With a change in the vane opening degree, a total vane gap area (more generally, flow sectional area (degree of supercharge in the turbocharger 60)) at the exhaust inlet 62b of the turbine 66 changes.

In this embodiment, the vane opening degree θ VG is changed discontinuously in a stepwise fashion, for example, in eight steps. That is, the vane opening degree θ VG is set to any one of first to eighth vane opening degrees. The total vane-gap area changes in dependence on the vane opening degree θ VG. The first to eighth vane opening degrees are each determined in advance so as to provide an appropriate total vane-gap area. In the following description, the first to eighth vane opening degrees are indicated by integers of 1 to 8 representative of the eight vane-opening-degree stages, respectively. Further, the vane-opening-degree stages 1–8 are sometimes referred to as vane opening degrees 1–8, respectively.

Figure 4:
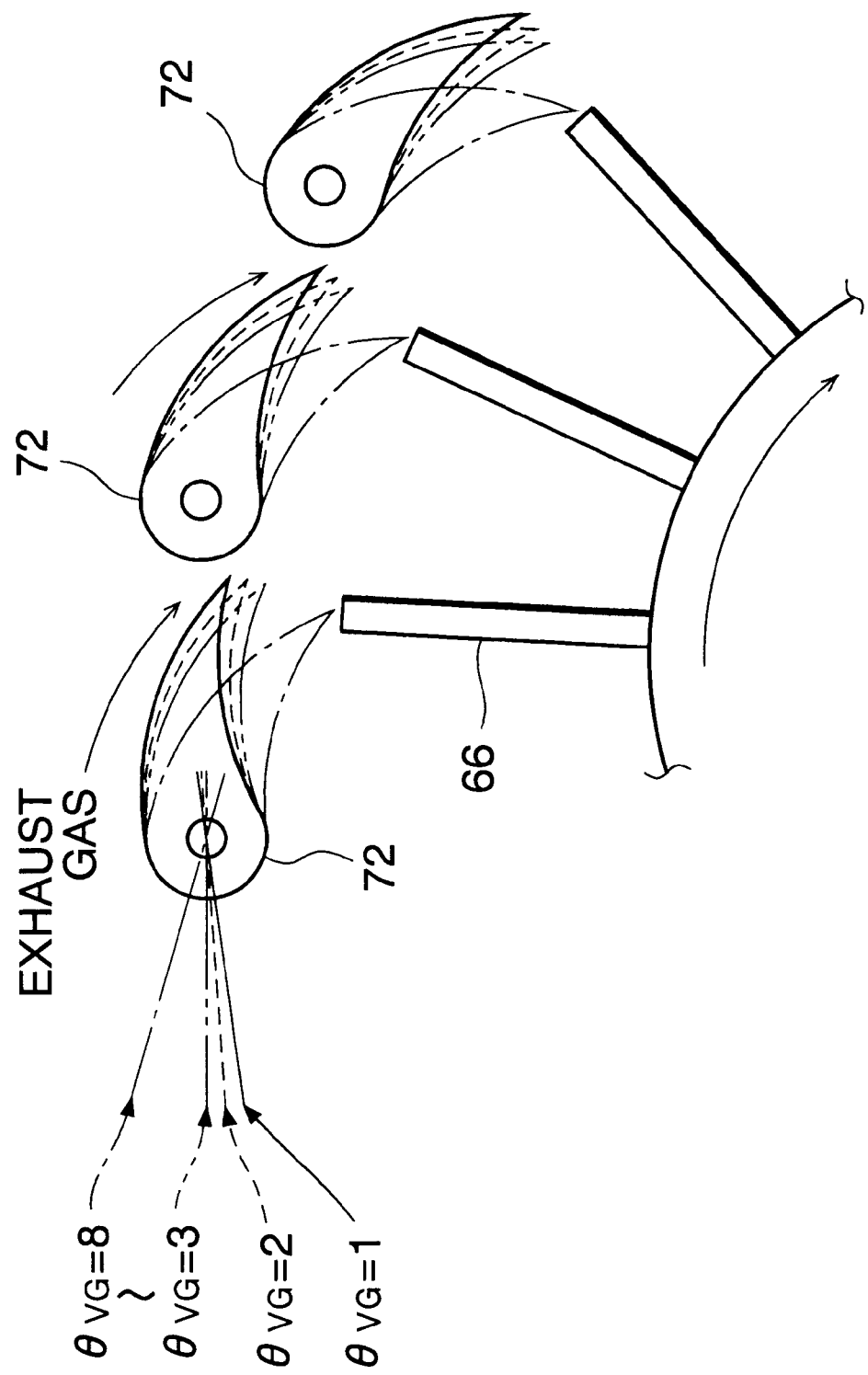
FIG. 4 is a schematic view showing a relation between vane opening degrees θ VG of movable vanes of the VG turbocharger and their rotation positions.

FIG. 4 shows vane rotation states at the vane-opening-degree stages 1, 2, 3 and 8. When the vane opening degree θ VG is at the vane-opening-degree stage 8 as shown by one-dotted chain line in FIG. 4, the rotation angle of each movable vane 72 in the clockwise direction becomes maximum, so that the vane gap, i.e., the total vane-gap area becomes maximum. As the vane-opening-degree stage decreases from 8 to 1, the rotation angle of the movable vane 72 and the vane gap decrease. That is, as shown by solid line in FIG. 4, the vane gap becomes minimum at the vane-opening-degree stage 1. At this time, there still exist the gaps between the vanes, and hence exhaust gas is permitted to flow through the gaps. In FIG. 4, broken line and two-dotted chain line indicate rotation states of the movable vane 72 when the vane opening degree θ VG is at the stages 2 and 3, respectively.

By changing the gaps between the movable vanes 72 in this manner, the velocity of exhaust gas blown through the variable nozzle unit 70 to the turbine 66 can be adjusted in a multi-stage fashion. That is, by changing the vane opening degree, it is possible to change the rotation speed NT of the turbine 66 independently of the exhaust gas flow amount which affects the turbine rotation speed.

Even if an amount of fuel supply is small and hence the rotation speed Ne of the engine 1 is low so that the amount of exhaust gas becomes small, the turbine rotation speed NT can be increased by adjusting the vane gap to a small value by means of the actuator 74. As the turbine rotation speed increases, the air-compression effect of the compressor 68 is enhanced, so that the boost pressure in the suction system increases, whereby the effect of supercharging can be enhanced.

In this embodiment, when the engine brake unit 30 is in operation, the vane opening degree θ VG is adjusted within a range, e.g., from a value of 1 to a value of 3 so as to cause the turbocharger 60 to effect a proper supercharging-degree enhancement action, in order to make the supercharging degree equal to or higher than an upper limit value of the supercharging degree attained at the time of non-operation of the engine brake unit 30.

By such a vane opening degree adjustment, it is possible to cause the VG turbocharger 60 to serve as an exhaust brake and to increase a supercharging pressure at which the suction air is supplied, thereby enhancing the engine brake effect of the compression-releasing engine brake unit 30, when the engine brake unit 30 is in operation.

Figure 3:
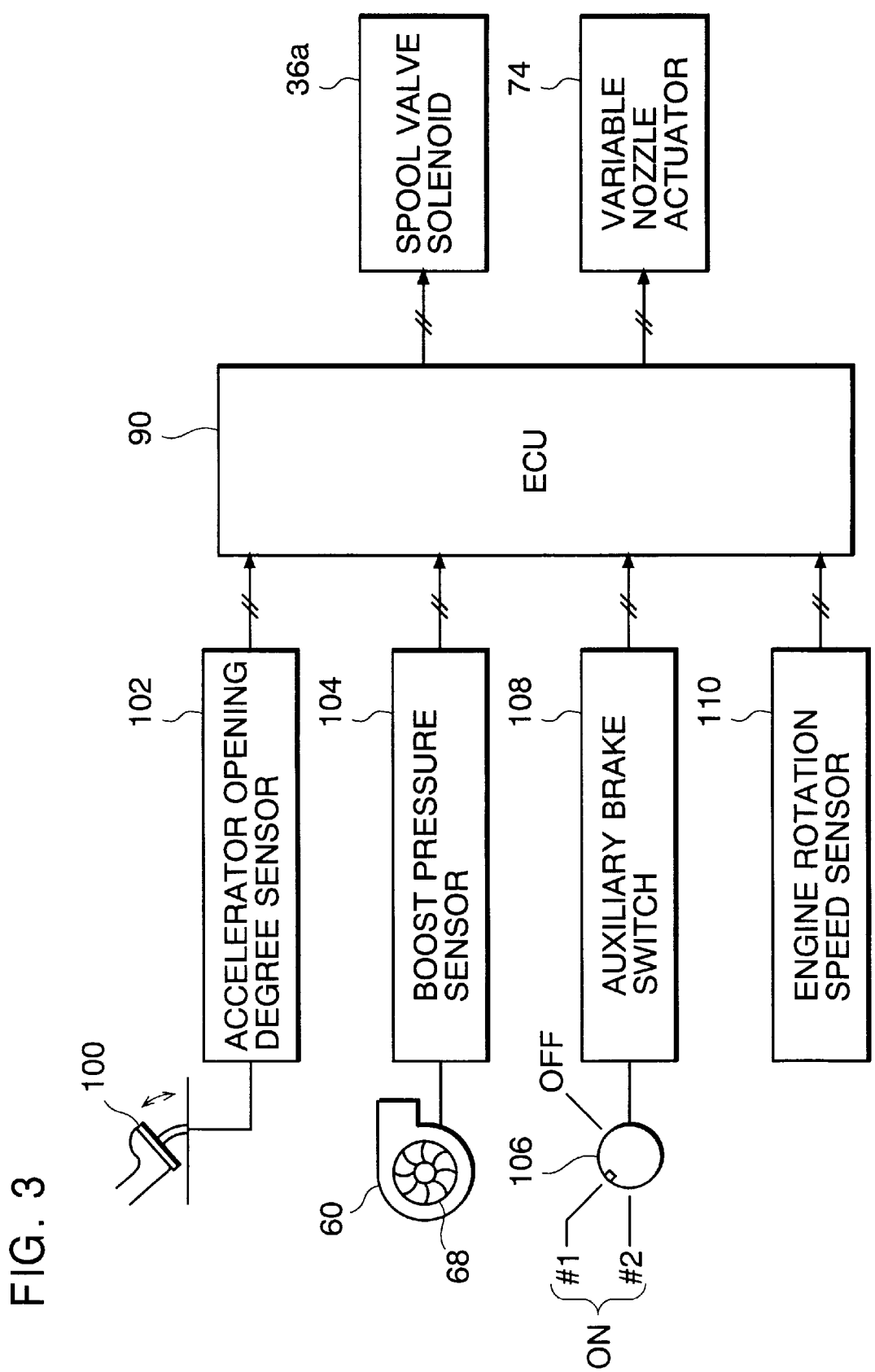
FIG. 3 is a block diagram showing the way of connecting the electronic control unit shown in FIG. 1 to a switching-operation member, auxiliary brake switch, various sensors, a solenoid, and actuator.

As shown in FIG. 3, the ECU 90 is connected at its input side with various sensors which include an accelerator opening degree sensor (engine load detecting means) 102 for detecting a depressed amount of an accelerator pedal, i.e., an accelerator opening degree θ ACC; a boost pressure sensor 104 (see FIG. 1) provided at a location downstream of the compressor 68 of the VG turbocharger 60 and operable to detect a boost pressure; an auxiliary brake switch 108 responsive to manipulation of a switching-operation member 106; an engine rotation speed sensor (engine rotation speed detecting means) 110 for detecting an engine rotation speed Ne; and other sensors (not shown).

The switching-operation member 106 is manipulated by an operator to be switched among an OFF position (OFF) where the operation of the engine brake unit 30 and the supercharging-degree enhancement operation of the VG turbocharger 60 are prohibited, a first mode position (#1) where a first control mode in which the operation of the engine brake unit and the supercharging-degree enhancement action of the turbocharger are allowed is selected, and a second mode position (#2) where a second control mode which is similar to the first control mode is selected. At the second mode position, the turbocharger 60 is allowed to effect the supercharging action at a degree higher than the supercharging degree attained when the first mode position is selected.

The auxiliary brake switch 108 takes an OFF position, a first mode position, or a second mode position depending on the changeover position of the switching-operation member 106. In the following description, the first and second mode positions are collectively referred to as ON position.

The ECU 90 are connected at its output side with the spool valve 36 of the engine brake unit 30, the variable nozzle actuator 74 of the VG turbocharger and the like as described above.

In the following, the operation of the engine 1, especially the auxiliary brake system, having the aforementioned construction, will be described.

During an engine operation, the ECU 90 which functions as a controller of the auxiliary brake system executes a vane-opening-degree control routine (shown in FIG. 5) for adjustment of a supercharging degree at intervals of a predetermined cycle.

First, at step S10, whether or not the auxiliary brake switch 108 is in an ON position is determined.

If a result of the determination at step S10 is negative (NO), it is determined that the driver has no intention of utilizing the auxiliary brake system. Whereupon the routine terminates without executing step S12 and subsequent steps. In this case, even if the accelerator pedal 100 is released from a depressed state so that driver's intention for declaration is indicated, the auxiliary brake system is disabled and the turbocharger is prevented from effecting a supercharging-degree enhancement action. Braking can be made only by operating an ordinary brake unit (not shown).

Even if the result of the determination at step S10 is NO or if the auxiliary brake system is disabled, in order to variably control the supercharging degree in the VG turbocharger depending on the engine rotation speed, a vane-opening-degree control routine (corresponding to steps S113–S119 in FIG. 12) at the time of non-operation of the auxiliary brake system is carried out.

Figure 6:
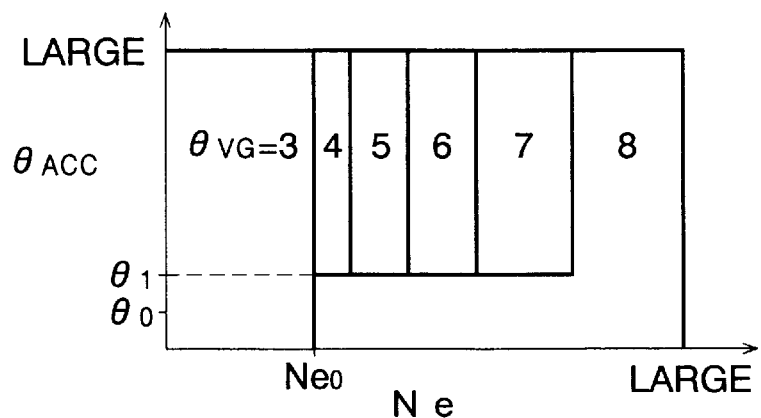
FIG. 6 is a map showing, as a function of engine rotation speed Ne and accelerator opening degree θ ACC, the vane opening degree θ VG used in a vane-opening-degree control at the time when the auxiliary brake system is disabled.

In this vane-opening-degree control routine, the vane opening degree θ VG (vane-opening-degree stage) at the time of non-operation of the auxiliary brake system is set, based on a map shown in FIG. 6, in accordance with engine rotation speed Ne and accelerator opening degree θ ACC.

If the accelerator opening degree θ ACC is equal to or greater than a predetermined value θ1, the vane opening degree θ VG is changed, as shown in FIG. 6, in six steps from the vane opening degree stage 3 to the stage 8 depending on the engine rotation speed Ne. The predetermined value θ1 is set to a value larger than a fuel-cut discrimination value θ0 which is used in a known fuel-cut range determination routine and in the later-mentioned fuel-cut range determination steps S14–S26 of FIG. 5. Preferably, the predetermined value θ0 is set to a value close to 0, rather than a value just equal to 0, considering a play of the accelerator pedal 100.

In case that the aforementioned requirement θ ACC≧θ1 is satisfied so that fuel supply to the engine 1 is carried out, the vane opening degree θ VG is set to a value which becomes smaller stepwise, within the vane opening degree range 3–8, as the engine rotation speed Ne decreases. When the engine 1 is in a low load state and the exhaust gas flow amount is small, the supercharging degree is enhanced.

In response to the aforementioned vane opening degree setting, the ECU 90 delivers a drive signal of a level corresponding to the thus set vane opening degree to the actuator 74 of the turbocharger 60. The rod 75 of the actuator 74 moves to a rod position corresponding to the drive signal level, thereby causing the circle plate 80, link member 78, pin 76 and movable vane 72 to rotate to their rotation positions corresponding to the rod position. As a result, the vane opening degree θVG is adjusted to the set value. Meanwhile, if the vane opening degree is equal to the set opening degree, such a vane opening degree is kept unchanged.

In case that the auxiliary brake system is disabled, if the accelerator opening degree θ ACC is smaller than the predetermined value θ1 and if the engine rotation speed Ne is larger than a predetermined value Ne0 (e.g., idling speed), the vane opening degree θ VG is set to its maximum value 8, thereby minimizing the supercharging degree.

If the accelerator opening degree θ ACC is smaller than the fuel-cut discrimination value θ0, it can be regarded that the driver does not intend to accelerate the engine and wishes to effect a coasting operation of the engine. Thus, it is determined in the fuel-cut determination routine (not shown) that a fuel supply interruption condition is satisfied, so that the fuel supply is terminated. In this case, if a requirement of Ne>Ne0 is satisfied, the vane opening degree θ VG is set to the maximum value 8.

In case that the accelerator opening degree θ ACC is smaller than the fuel-cut discrimination value θ0, if the engine rotation speed Ne is equal to or smaller than the predetermined value Ne0, that is, if the engine is in idling operation region, the vane opening degree θ VG is set to a small value 3.

Even if the accelerator opening degree θ ACC is in the vicinity of or less than the predetermined value θ0, the fuel supply for idle rotation is usually carried out during the idle operation of the engine. Therefore, in this embodiment, the vane opening degree θ VG is set to the value 3 as described above. As a result, the supercharging effect is enhanced to improve combustion efficiency of fuel for idling rotation, thereby preventing engine stall.

Another reason why the vane opening degree is adjusted to the value 3 during the idling rotation is as follows: Although the amount of supplied fuel is small during the idling operation, exhaust gas pressure and exhaust gas flow speed which affect the movable vanes 72 sometimes become excessive, if the vane opening degree is adjusted to a value 1 or 2 smaller than the value 3. In that case, the turbine 66 may reach its rotation speed limit NTMAX, so that the VG turbocharger 60 may fail.

Figure 5:
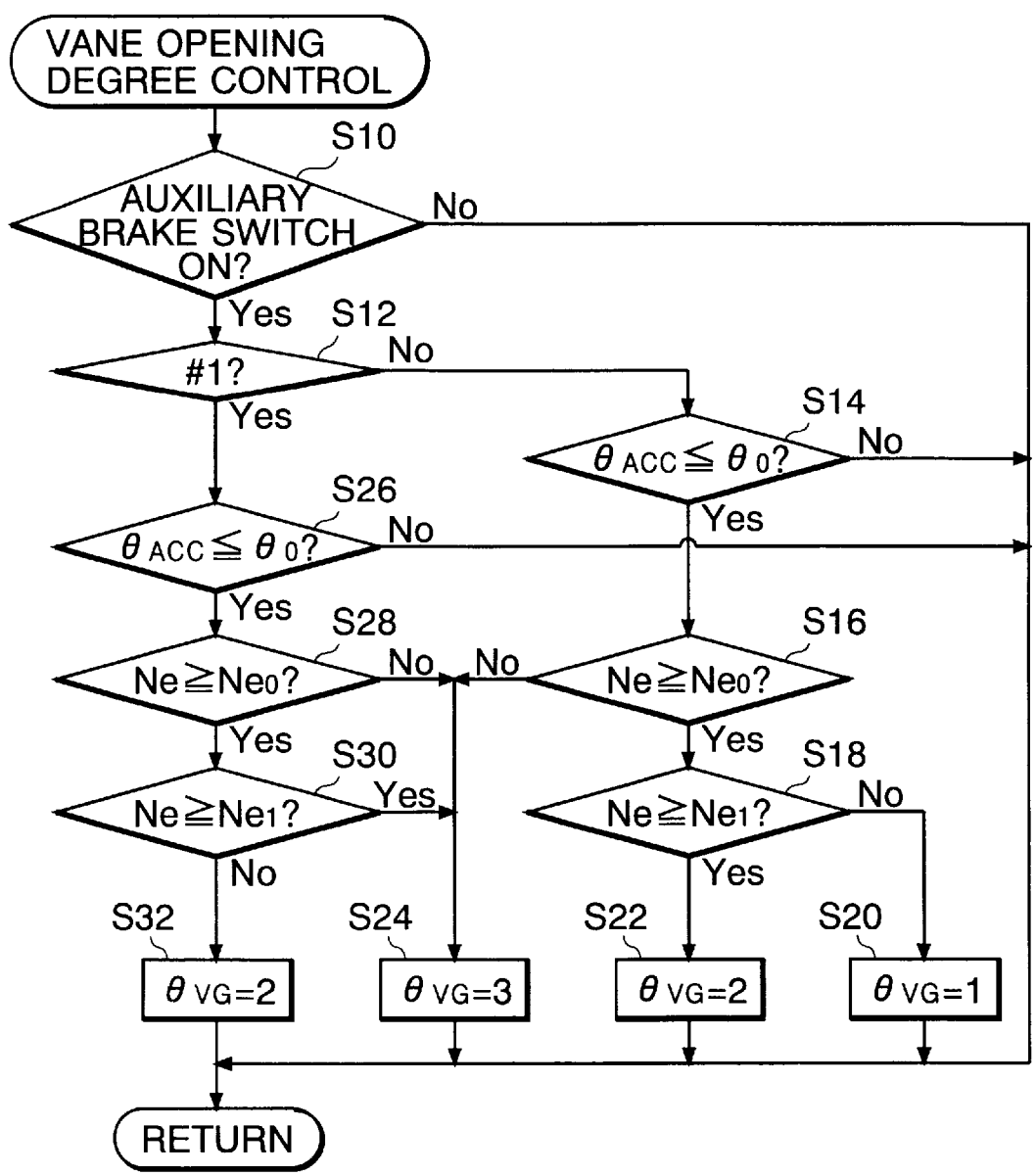
FIG. 5 is a flowchart showing a vane-opening-degree control routine executed by the electronic control unit.

In case that the result of determination at step S10 in the vane-opening-degree control routine shown in FIG. 5 is affirmative (YES) and hence the auxiliary brake switch 108 is in the ON position, if the engine 1 is operated within the fuel-cut region, the operation of the engine brake unit 30 and the supercharging degree enhancement action of the turbocharger 60 can be allowed. The supercharging degree in the fuel-cut range differs between when the auxiliary brake system is driven in the first control mode and when it is driven in the second control mode.

Thus, prior to making a determination as to whether or not the engine is operated in the fuel-cut region, a determination is made as to which of the first and second control modes is selected. If it is determined at step S10 that the auxiliary brake 108 is in the ON position, the flow proceeds to step S12 in which whether or not the auxiliary brake switch 108 is in the first mode position (#1) is determined.

If the result of determination at step S12 is NO or if the auxiliary brake switch 108 is in the second mode position, whether or not the accelerator opening degree θ ACC is equal to or less than the fuel-cut discrimination value θ 0 is determined at step S14 in order to determine whether or not the engine 1 is in the fuel-cut region. If the result of this determination is NO or if the accelerator opening degree θ ACC is larger than the value θ 0 so that the engine 1 is not in the fuel-cut region, this routine terminates without carrying out the processing of step S12 and subsequent steps.

Figure 7:
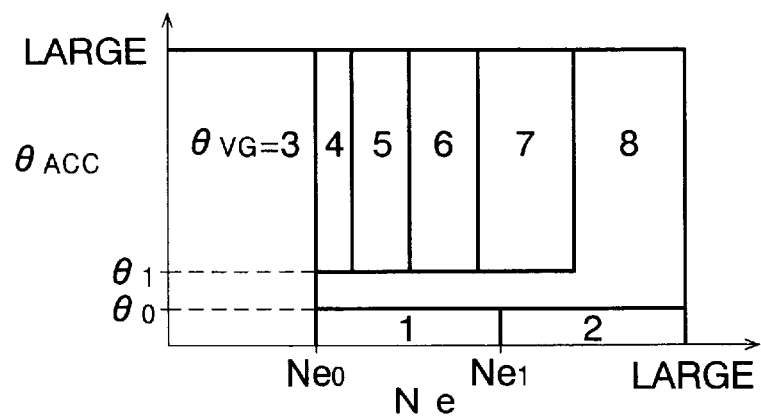
FIG. 7 is a vane-opening-degree map used in the vane-opening-degree control performed in a second control mode.

In this case, the vane opening degree control for a non-fuel-cut region, which is similar to the vane opening degree control (FIG. 6) at the time when the auxiliary brake is disabled, is carried out according to the map shown in FIG. 7. The vane opening degree θ VG is changed in six steps from the vane-opening-degree stage 3 to the stage 8 depending on the engine rotation speed Ne. Meanwhile, it is not indispensable to effect a determination as to decelerated engine operation based on the accelerator opening degree. The determination on decelerated engine operation may be made based on, e.g., the rate of change in accelerator opening degree.

On the other hand, if the result of determination at step S14 is YES, or if it is determined that the accelerator opening degree θ ACC is equal to or less than a predetermined value θ0 so that the engine 1 is in a decelerated operation region, the flow proceeds to step S16.

At step S16, a determination is made as to whether or not the engine rotation speed Ne is equal to or higher than a predetermined value Ne0 (e.g., idling rotation speed). If the result of this determination is NO, or if the engine rotation speed Ne is smaller than the predetermined value Ne0, it is determined that the fuel supply for the idling rotation is carried out. That is, it is determined that the engine 1 is not in the fuel-cut region, but in an idling operation region in which the fuel supply is made. In this case, the flow proceeds to step S24 in which the vane opening degree θ VG is adjusted to a slightly large value of 3 on the basis of the map shown in FIG. 7, thereby improving combustion efficiency of fuel for idling rotation and preventing engine stall.

If the result of determination at step S16 is YES, or if the engine rotation speed Ne is equal to or larger than the predetermined value Ne0, the engine 1 is in the fuel-cut region. Thus, it is determined that the turbocharger 60 is allowed to effect a supercharging-degree enhancement action. In this embodiment, the degree of supercharging at the time of the supercharging-degree enhancement action is adjusted to a different value between when the engine is in a high speed region and when it is in a low speed region. The flow proceeds to step S18 in order to determine whether the engine is in the high speed region or low speed region.

At step S18, whether or not the engine rotation speed Ne is equal to or larger than the predetermined value Ne1 (e.g., 1900 rpm) is determined. If the result of this determination is NO, or if the engine rotation speed Ne is smaller than the predetermined value Ne1, the flow proceeds to step S20 in which the vane opening degree θ VG is adjusted to the minimum value 1 based on the map shown in FIG. 7. On the other hand, if the result of the determination is YES, or if the engine rotation speed Ne is equal to or larger than the predetermined value Ne1, the flow proceeds to step S22 in which the vane opening degree θ VG is adjusted to the value of 2 based on the map shown in FIG. 7.

In case that the auxiliary brake switch 108 is at the second mode position, if the engine is operated in the fuel-cut region, the engine brake unit 30 is operated under the control of the ECU 90. At the same time, in accordance with the engine rotation speed Ne, the vane opening degree θ VG is adjusted to the vane opening degree 1 or 2, which is smaller than the minimum vane opening degree 3 at the time of non-operation of the engine brake unit 30, as explained in the above.

At the time of fuel-cut operation, the exhaust gas flow amount and exhaust gas pressure are both small since suction air is not consumed for fuel combustion but is discharged as it is. However, by minimizing the vane opening degree θ VG to the value 1 or 2 as described above, the turbine rotation speed NT can be increased to enhance the efficiency of supercharging, thereby intensifying the engine brake effect of the engine brake unit 30. Further, as a result of the minimization of the vane opening degree, the exhaust passage in the VG turbocharger 60 is throttled, so that the exhaust brake effect of the VG turbocharger 60 can be enhanced properly. That is, the auxiliary-brake-force generating effect of the auxiliary brake system can be enhanced.

Figure 9:
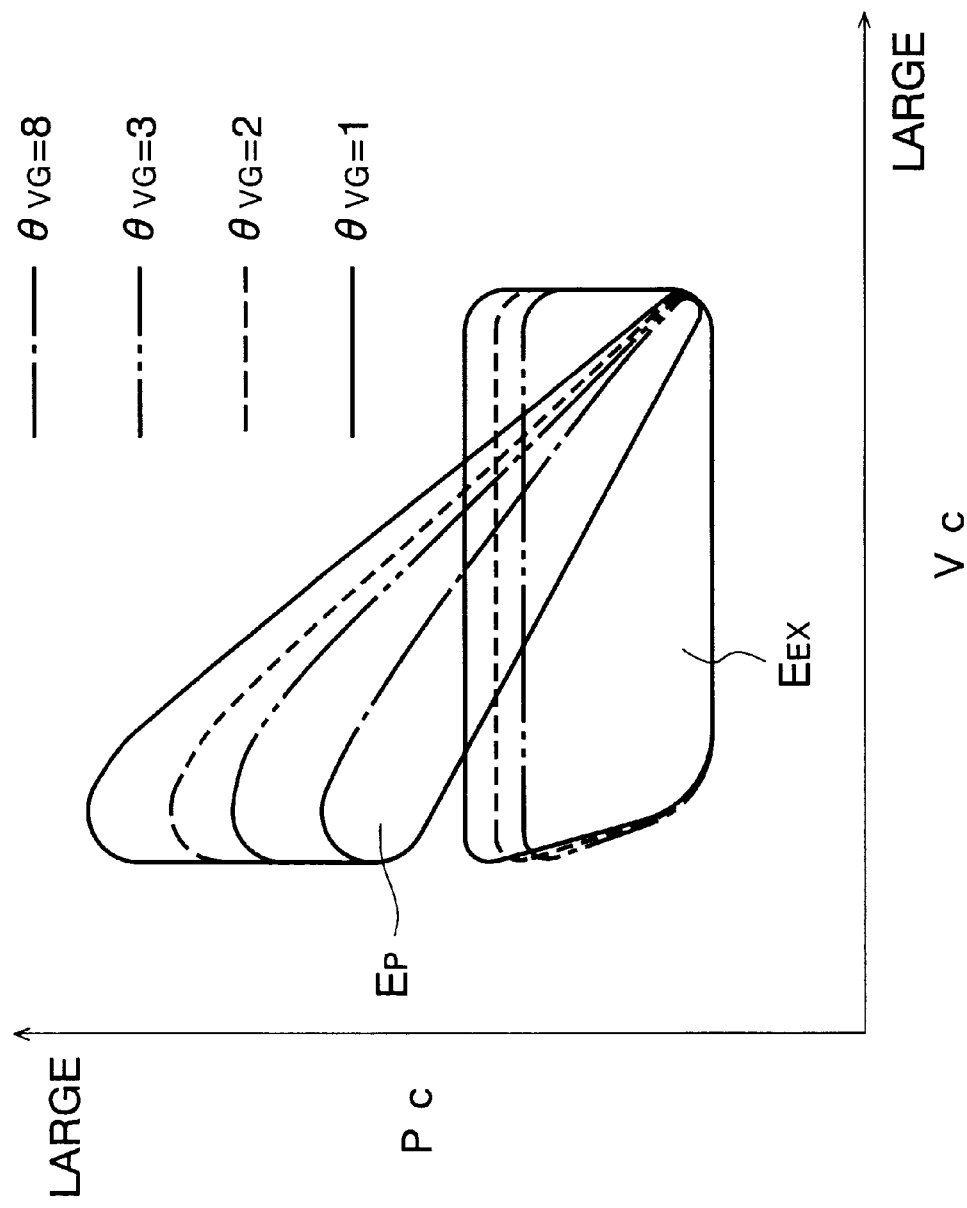
FIG. 9 is a diagram showing a relation between cylinder volume Vc and cylinder pressure Pc in a case where no combustion of fuel takes place, and showing, as a function of vane opening degree θ VG, absorption energy absorbed by auxiliary braking.

FIG. 9 shows a pressure (in-cylinder pressure Pc) in the combustion chamber 10 at the time of fuel cut, as a function of volume (in-cylinder volume Vc) of the combustion chamber 10 which changes depending on piston position. In FIG. 9, the solid line, broken line, two-dotted chain line, and one-dotted chain line respectively indicate in-cylinder pressure vs. in-cylinder volume curves for the cases where the vane opening degree is at the value 1, 2, 3 and 8, respectively. Referring to FIG. 9, four rectangular areas EEX surrounded by the solid line, broken line, two-dotted chain line, and one-dotted chain line respectively indicate amounts of absorption energy absorbed by means of the exhaust brake function of the VG turbocharger 60 when the vane opening degree is set at the value 1, 2, 3 and 8, respectively. Further, four triangular areas EP respectively indicate amounts of absorption energy absorbed by means of the engine brake function of the engine brake unit 30.

As seen from FIG. 9, the smaller the vane opening degree θ VG becomes, the larger both the absorption energy amounts EEX and EP by the exhaust brake function and by the engine brake function become. Therefore, when the vane opening degree θ VG is extensively decreased to the value 1 or 2, the exhaust brake effect and the engine brake effect become very large.

The reason why the vane opening degree θ VG is changed from the value 1 (small) to the value 2 (larger), as explained above, when the engine rotation speed changes from a speed lower than the predetermined value Ne1 to a speed higher than the value Ne1 is as follows: If the vane opening degree θ VG is kept at the small value 1 even in a high engine rotation region in which Ne≧Ne1 is satisfied, the turbine rotation speed NT may reach its rotation speed limit NTMAX even in the fuel-cut region in which the expansion, due to combustion of fuel, of exhaust gas does not occur. Such an excessive turbine rotation can result in a faulty of the VG turbocharger 60. By changing the vane opening degree from the value 1 to the value 2, it is possible to prevent such a drawback and maintain the turbine rotation speed NT substantially constant regardless of the engine rotation speed Ne.

Figure 8:
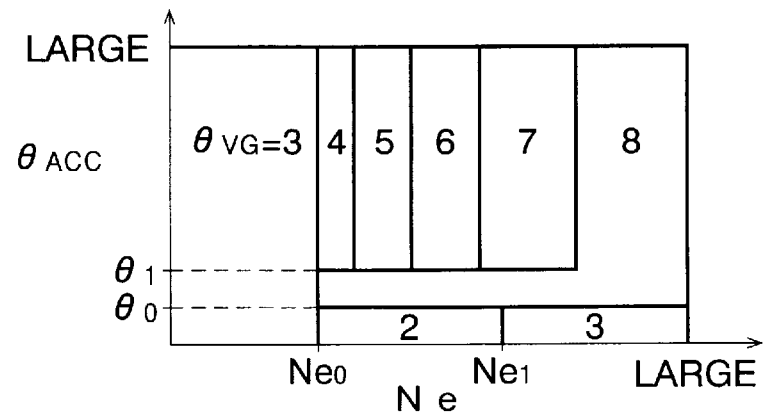
FIG. 8 shows a vane-opening-degree map used in the vane-opening-degree control performed in a first control mode.

If the result of the determination at step S12 is YES or if the first control mode is selected, the vane opening degree θ VG is set in accordance with the engine rotation speed Ne and accelerator opening degree θ ACC based on a map shown in FIG. 8.

To this end, at step S26, a determination is made as to whether or not the accelerator opening degree θ ACC is equal to or smaller than the fuel-cut discrimination value θ0.

If the result of this determination is NO or if the accelerator opening degree θ ACC is larger than the predetermined value θ0, the engine is not in the fuel-cut region, so that this control routine terminates without carrying out step S28 and the subsequent steps. In this case, the vane opening degree θ VG is controlled based on the map shown in FIG. 8 within the range from the value 3 to the value 8 depending on the engine rotation speed Ne. On the other hand, if the result of the determination at step S26 is YES or if the accelerator opening degree θ ACC is equal to or smaller than the predetermined value θ0, the flow proceeds to step S28 in order to determine whether the engine is in the fuel-cut region or in the idling operation region.

At step S28, whether the engine rotation speed Ne is equal to or higher than the predetermined value Ne0 is determined. If the result of this determination is YES, or if the engine rotation speed Ne is equal to or higher than the predetermined value Ne0, it is determined that the engine is in the fuel-cut region. In this case, the flow proceeds to step S30 in order to determine whether the engine is operated in a high or low engine rotation speed zone of the fuel-cut region.

At step S30, whether or not the engine rotation speed Ne is equal to or higher than a predetermined value Ne1 (e.g., 1900 rpm) is determined. If the result of this determination is YES or if the engine rotation speed Ne is equal to or higher than the predetermined value Ne1, so that it is determined that the engine is operated in the high engine speed zone of the fuel-cut region, the flow proceeds to step S24 in which the vane opening degree θ VG is set to the value 3 based on the map shown in FIG. 8. On the other hand, if the result of the determination at step S30 is NO or if the engine rotation speed Ne is smaller than the predetermined value Ne1, the flow proceeds to step S32 in which the vane opening degree θ VG is set to the value 2 according to the map shown in FIG. 8.

That is, in case that the first control mode is selected, if the engine rotation speed Ne is equal to or higher than the predetermined value Ne0 and if the accelerator opening degree θ ACC is equal to or smaller than the predetermined value, it is determined that the engine is in the fuel-cut region so that the engine brake unit 30 is rendered operative, and at the same time, the vane opening degree θ VG is set to the value 2 or 3 in dependence on the engine rotation speed Ne. As a result, like in the second control mode, the VG turbocharger 60 functions as an exhaust brake, and the supercharging degree is increased so as to enhance the engine brake effect of the engine brake unit 30.

Meanwhile, in the first control mode, the vane opening degree θ VG is set to a value slightly larger than that for the second control mode, thereby restraining the effect of the auxiliary brake in consideration of a convenience for the driver and durability of the VG turbocharger 60. That is, the driver is permitted to operate the auxiliary brake manually to select the first or second control mode in dependence on loaded vehicle weight, gradient of a descending slope on which the vehicle is traveling, or the like, thereby selecting the degree of effect of auxiliary brake (supercharging degree) so as to improve drivability of the vehicle. In case that a large auxiliary brake force is not required to be produced, it is possible to suppress the turbine rotation speed NT by selecting the first control mode, to thereby reduce the possibility of failure of the VG turbocharger.

Another primary reason why the vane opening degree θ VG is changed from the value 2 to the value 3 when the engine rotation speed Ne reaches the predetermined value Ne1 (e.g., 1900 rpm) is to maintain the turbine rotation speed NT substantially constant regardless of the engine rotation speed Ne.

If the result of the determination at step S28 is NO or if the engine rotation speed Ne is smaller than the predetermined value Ne0, it is determined that the fuel supply for the idling rotation is being carried out, and the flow proceeds to step S24 where the vane opening degree θ VG is set to the value 3 based on the map shown in FIG. 8, thereby improving combustion efficiency of fuel for idling rotation, preventing engine stall.

Figure 10:
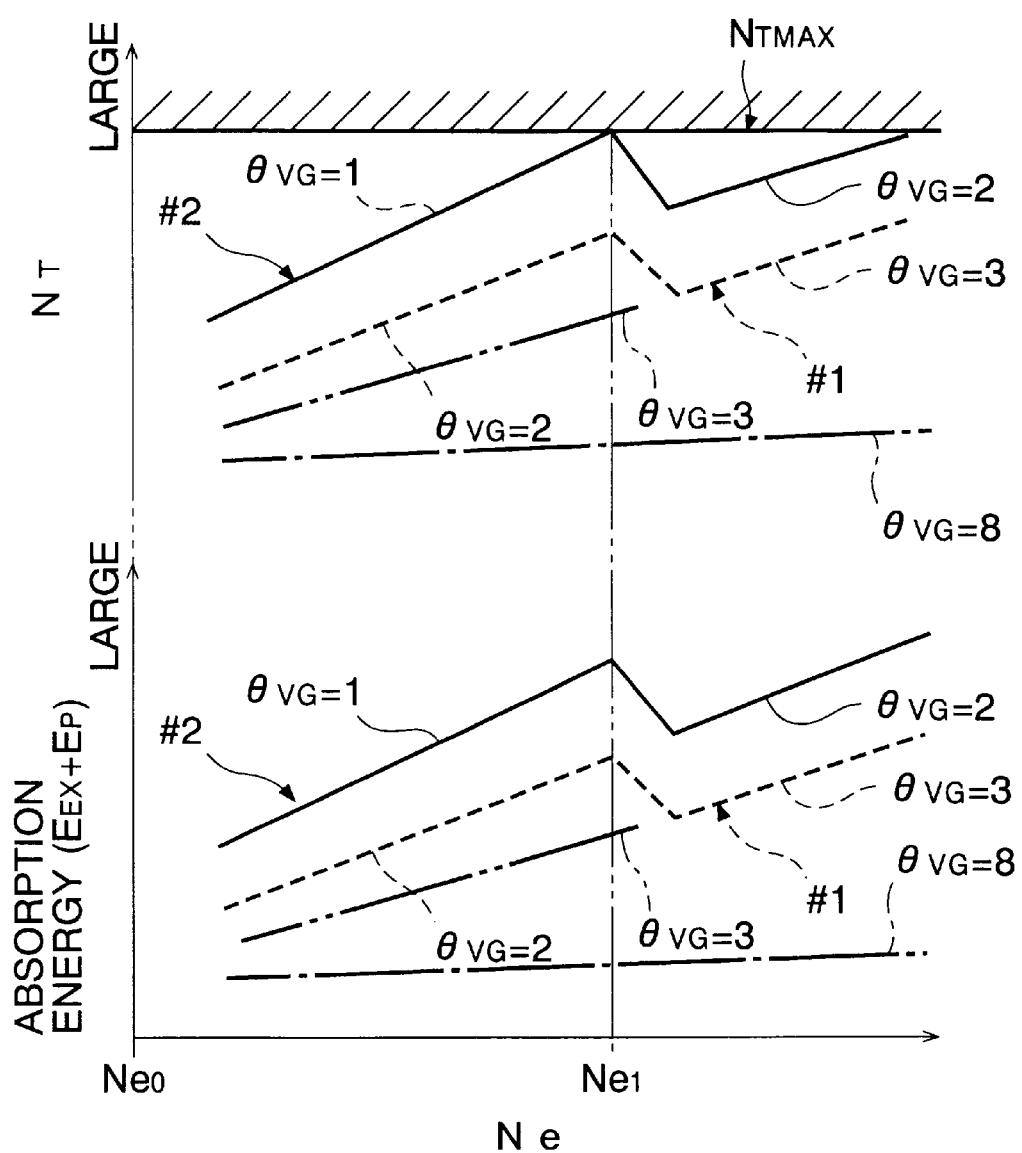
FIG. 10 is a diagram showing, as a function of engine rotation speed Ne, a turbine rotation speed NT and absorption energy at the time when the auxiliary brake system according to the first embodiment is in operation.

FIG. 10 shows an operating characteristic of the auxiliary brake system of this embodiment. The characteristic line shown at an upper part of FIG. 10 shows a change in the turbine rotation speed NT with the change in the engine rotation speed Ne in the fuel-cut region (Ne≧Ne0 and θACC≦0). The turbine rotation speed NT which is closely related to durability of the turbocharger is preferable for evaluation of the durability and is measurable. The characteristic line shown at a lower part of FIG. 10 shows a change in total absorption energy (EEX+EP) absorbed by the auxiliary brake system in the fuel-cut region with the change in engine rotation speed Ne. The total absorption energy corresponds to the auxiliary brake force produced by the auxiliary brake system and is preferable for evaluation of the brake force. EEX and EP respectively indicate absorption energy absorbed by the exhaust brake function and absorption energy absorbed by engine brake function of the auxiliary brake system, respectively. The values EEX and EP can be calculated based on the in-cylinder pressure vs. in-cylinder volume curves (FIG. 9) obtained from in-cylinder pressure Pc which is measurable.

When the auxiliary brake system is rendered inoperative, the vane opening degree θ VG is maintained at the maximum value 8 (see FIG. 6) in an engine rotation region where the engine rotation speed Ne is equal to or higher than the value Ne0. In this case, the supercharging degree is minimized, and the turbine rotation speed NT is kept at small values throughout the entirety of the engine rotation region where the engine rotation speed is equal to or higher than Ne0, as shown by one-dotted chain line at an upper part of FIG. 10. Because the turbine rotation speed NT is kept small in this manner, the absorption energy (EEX+EP) by the auxiliary brake system is kept small throughout the entirety of the engine rotation region where the engine rotation speed is equal to or higher than Ne0, as shown by one-dotted chain line at a lower part of FIG. 10.

In the case of the vane opening degree adjustment carried out in the second control mode (#2), the vane opening degree θ VG is set to the minimum value 1 so that the supercharging degree becomes maximum in the low engine rotation speed zone of the fuel-cut region in which the accelerator opening degree θ ACC is equal to or less than the fuel-cut discrimination value θ0 and the engine rotation speed Ne changes from the predetermined value Ne0 (idle rotation speed) to the predetermined value Ne1 (e.g., 1900 rpm). In this case, as shown by the solid line in the upper-left portion of FIG. 10, the turbine rotation speed NT is quite high even when the engine rotation speed is at a small value Ne0, increases as the engine rotation speed Ne increases, and approaches a turbine rotation speed limit NTMAX when the engine rotation speed reaches the predetermined value Ne1. In the engine rotation zone where the engine speed changes in a range from Ne0 to Ne1, the absorption energy (EEX+EP) becomes a very large value, as shown by the solid line in the lower left portion of FIG. 10.

In the vane opening degree adjustment effected in the second control mode, the vane opening degree θ VG is set to the value 2 (FIG. 7) in a high engine rotation speed zone of the fuel-cut region in which the engine rotation speed Ne exceeds the value Ne1. In this case, in an engine rotation region where the engine rotation speed Ne is slightly higher than the value Ne1, the turbine rotation speed NT decreases from a value close to the speed limit NTMAX with the increase in the engine rotation speed, as shown by the solid line in the upper right portion of FIG. 10. In an engine rotation range where the engine rotation speed Ne is sufficiently higher than the value Ne1, the turbine rotation speed NT increases as the engine rotation speed Ne increases, and approaches the speed limit N TMAX again.

As described above, in the engine rotation zone where the engine speed exceeds the value Ne1, the turbine rotation speed NT becomes large within a range where the turbine speed does not exceed the speed limit NTMAX, so that the supercharging degree becomes quite large. Thus, the absorption energy (EEX+EP) take a large value which is maintained substantially constant, as shown by the solid line in the upper-right portion of FIG. 10. Therefore, in a case when the loaded vehicle weight is heavy and/or the gradient of a descending slope is large, selection of the second control mode makes it possible to produce a strong braking force with good response, thereby improving the stability of vehicle traveling.

In the case of carrying out the vane-opening-degree adjustment in the first control mode (#1), the vane opening degree θ VG is set to the value 2 if the engine operates in the low engine rotation speed zone of the fuel-cut region where the accelerator opening degree θ ACC is equal to or less than the fuel-cut discrimination value θ0 and the engine rotation speed Ne varies within a range from the value Ne0 to the value Ne1. When the engine operates in the high engine rotation speed zone of the fuel-cut region where the engine rotation speed Ne exceeds the value Ne1, the vane opening degree θ VG is set to the value 3. Thus, as shown by the broken lines in the upper and lower portions of FIG. 10, both the turbine rotation speed NT and the absorption energy (EEX+EP) increase with the increase in the engine rotation speed. After temporarily decrease, the turbine rotation speed and the absorption energy increase again, as the engine rotation speed further increases. The turbine rotation speed and the absorption energy take smaller values than those attained in the second control mode at the same engine rotation speed. On the other hand, the engine rotation speed and the absorption energy in the engine rotation speed zone where the engine speed varying in the range from Ne0 to Ne1 take larger values than those (shown by two-dotted chain line in the upper-left and lower-left portions of FIG. 10) attained at the same engine rotation speed in case the vane opening degree is adjusted to the value 3. That is, the first control mode makes it possible to obtain an appropriately enhanced auxiliary brake force.

As described above, according to the auxiliary brake system of this embodiment, the vane opening degree θ VG of the movable vanes 72 of the VG turbocharger 60, at the time when the engine brake unit 30 is operated in response to the engine operation in the fuel-cut region, is set to the value 1 or 2 which is a smaller than the minimum vane opening degree 3 for an engine operating region except the fuel-cut region. Therefore, it is possible to, in the fuel-cut region, make the turbocharger 60 function as an exhaust brake properly and at the same time strengthen the supercharge action of the turbocharger to thereby enhance the engine brake function of the compression-releasing engine brake unit 30, while making the VG turbocharger 60 function as a supercharger properly in an engine operating range, especially in an accelerating region, other than the fuel-cut region. Therefore, the auxiliary brake system is enabled to exert strong braking with good response.

According to the auxiliary brake system of this embodiment, in case that the second control mode is selected, the vane opening degree θ VG is switched from the minimum value 1 to the value 2 before the turbine rotation speed NT reaches its rotation speed limit NTMAX due to an increase of the engine rotation speed. This prevents a trouble in the VG turbocharger 60 caused by excessive rotation of the turbine 66 in the high engine rotation speed zone of the fuel-cut region, thereby improving the durability of the turbocharger, and at the same time the turbine rotation speed NT and the absorption energy are maintained at values falling within preferable ranges throughout the entirety of the fuel-cut region, thereby obtaining an appropriate braking force. From a similar viewpoint, the vane opening degree is switched between the values 2 and 3 depending on the engine rotation speed, when the first control mode is selected.

In the above embodiment, the vane opening degree control mode can be selected between the first and second control modes when the auxiliary brake switch 108 is at the ON position. Alternatively, when the auxiliary brake switch is at the ON position, the vane opening degree control may be made in the second control mode alone, to thereby set the vane opening degree in the fuel-cut region to the value 1 or 2.

In this embodiment, at the time of engine deceleration accompanied by a fuel-cut operation, the vane opening degree θ VG is switched in two stages, that is, between values 1 and 2 or between values 2 and 3 in dependence on the engine rotation speed Ne. Alternatively, the vane opening degree θ VG may be switched in a multi-stage fashion among three or more values including the value 1 or 2, whereby the turbine rotation speed NT and the absorption energy are controlled more finely and maintained substantially constant and the rotation speed NT is maintained at a value smaller than the rotation speed limit NTMAX, so that a further appropriate braking force and improved durability of the VG turbocharger 60 can be attained.

In the following, an auxiliary brake system according to a second embodiment of the present invention will be described.

Figure 11:
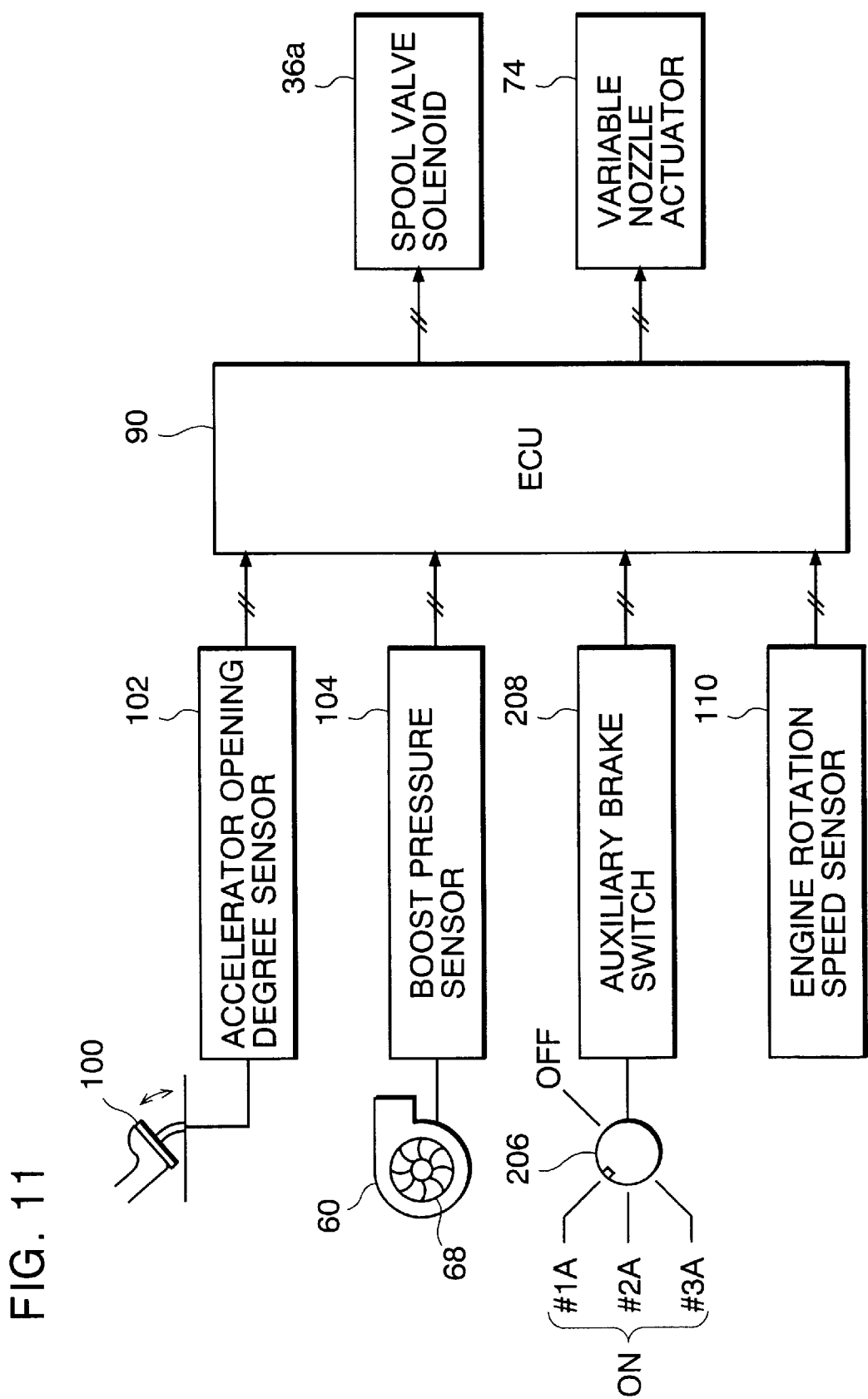
FIG. 11 is a diagram showing the way of connecting the electronic control unit to a switching-operation member, auxiliary brake switch and the like in an auxiliary brake system according to a second embodiment of the present invention.

As compared to the first embodiment in which the vane opening degree control in the fuel-cut region may be conducted in either of the two control modes, this embodiment is characterized in that the vane opening degree control in the fuel-cut region may be performed at any one of three control modes. Except that the number of control modes is different, the apparatus of this embodiment is basically the same as the first embodiment. That is, the auxiliary brake system of this embodiment may be constructed as shown in FIGS. 1–4. However, in order to enable selection of any one of the three control modes, this embodiment utilizes a switching-operation member 206 and an auxiliary brake switch 208 shown in FIG. 11 instead of the switching-operation member 106 and the auxiliary brake switch 108 shown in FIG. 4.

The switching-operation member 206 is adapted to be manually operated by the driver and is changed over between an OFF position (OFF) where both the operation of the engine brake unit 30 and the supercharging-degree enhancement action of the VG turbocharger 60 are prohibited, a first mode position (indicated by reference numeral #1A in FIG. 11) at which a first control mode where the supercharging-degree enhancement action of the turbocharger is prohibited but the operation of the engine brake unit is allowed is selected, a second mode position (#2A) at which a second control mode where both the operation of the engine brake unit 30 and the supercharging-degree enhancement action of the turbocharger 60 are allowed is selected, and a third mode position (#3A) at which a third control mode similar to the second control mode is selected.

When the switching-operation member 206 is at the OFF position or at the first mode position, the vane opening degree control is carried out based on the map shown in FIG. 6. When the switching-operation member 206 is at the second mode position, the vane opening degree control based on the map shown in FIG. 7 is carried out. When the switching-operation member 206 is at the third mode position, the vane opening degree control based on the map shown in FIG. 8 is carried out, so that the turbocharger 60 is allowed to effect the supercharging operation at a degree higher than the supercharging degree attained when the second mode position is selected.

The auxiliary brake switch 208 takes an OFF position, a first mode position, a second mode position or a third mode position in dependence on the switched position of the switching-operation member 106. In the following description, the first, second and third mode positions is collectively referred to as ON position.

As described above, the vane opening degree control, at the time when the auxiliary brake system is disabled and at the time when the first control mode is selected, of this embodiment corresponds to the vane opening degree control of the first embodiment performed when the auxiliary brake system is disabled. The second and third control modes of this embodiment respectively correspond to the first and second control mode of the first embodiment.

In the following, an operation of the auxiliary brake system according to this embodiment will be described.

Figure 12:
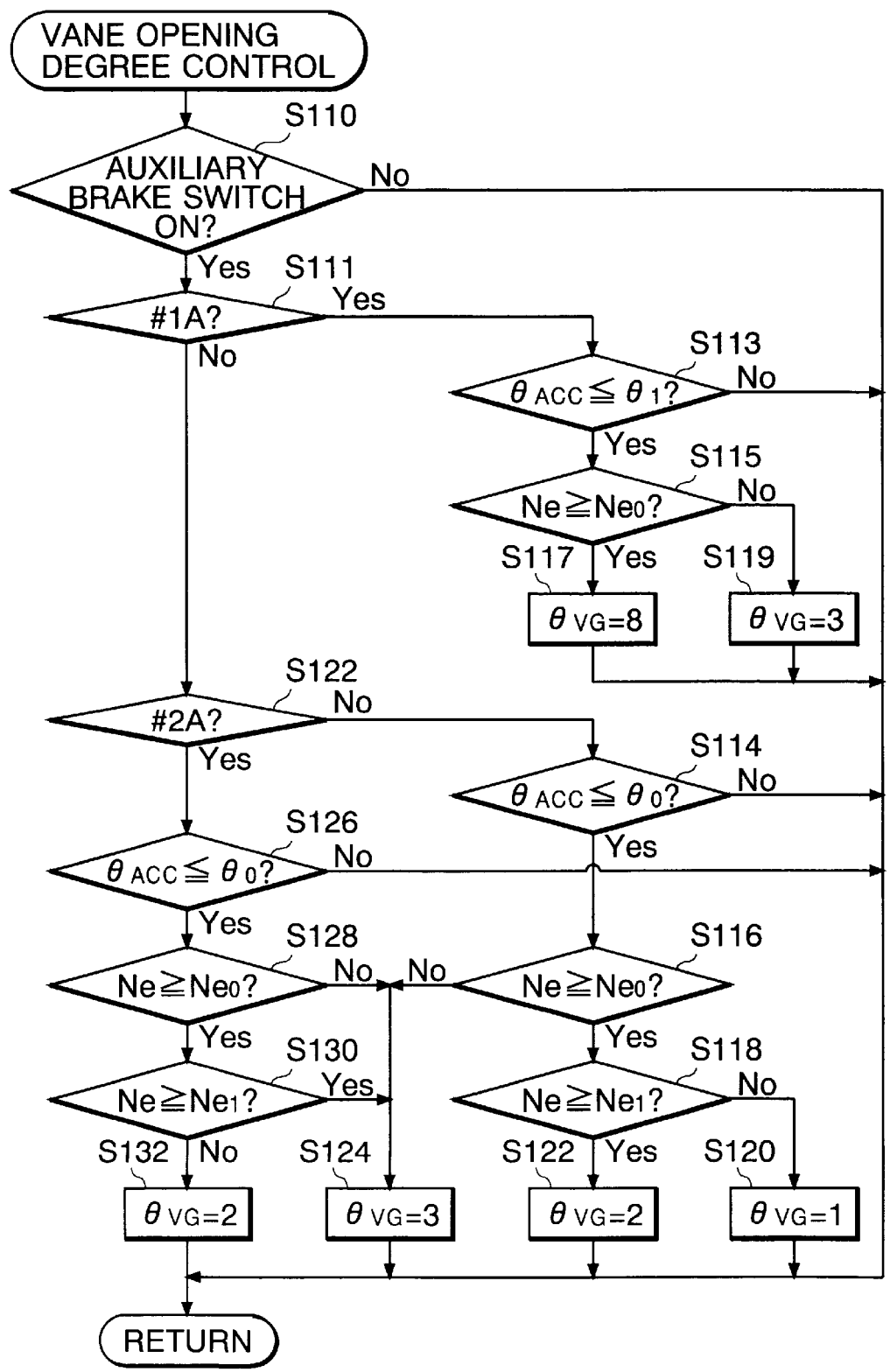
FIG. 12 is a flowchart showing a vane-opening-degree control routine according to the second embodiment.

During engine operation, the ECU 90 executes a vane-opening-degree control routine shown in FIG. 12. This control routine is similar to the vane-opening-degree control routine shown in FIG. 5. Each of those steps of FIG. 12 which correspond to like steps of FIG. 5 is indicated by a step number which is equal to the sum of 100 and the step number of the associated step. A description of these steps will be simplified.

First, if a result of determination at step S110 corresponding to step S10 in FIG. 5 is NO or if it is determined that the auxiliary brake switch 208 is not at the ON position, this control routine terminates without carrying out step S111 and subsequent steps. In this case, even if the accelerator pedal 100 is released from a depressed state indicating a driver's intention causing the engine to decelerate, the auxiliary brake system is rendered inoperative.

When the auxiliary brake system is disabled, in an accelerator opening degree zone in which θ ACC≧θ1 is satisfied, the vane opening degree θ VG is changed in six stages from the vane-opening-degree stage 3 to the stage 8 depending on the engine rotation speed Ne, based on the map shown in FIG. 6. As a result, when the engine load is low so that an amount of exhaust gas is small, the supercharging degree is enhanced. On the other hand, in the accelerator opening degree zone where θ ACC<θ1 is satisfied, the vane opening degree θ VG is set to the maximum value 8, if the engine rotation speed Ne is higher than a predetermined value Ne0 so as to minimize the supercharging degree, whereby an unnecessary supercharging, e.g., at the time of coasting is inhibited. When the engine rotation speed Ne is smaller than the predetermined value Ne0, the vane opening degree θ VG is set to a small value 3, thereby preventing engine stall at the time of idling rotation and excessive rotation of the turbine 66.

If the result of the determination at step S110 is YES or if it is determined that the auxiliary brake switch 108 is at the ON position, a determination is made as to which of the first, second and third control modes is selected. To this end, the flow proceeds to step S111 in which whether or not the auxiliary brake switch 108 is at the first mode position (#1A) is determined.

If the result of the determination at step S111 is YES or if it is determined that the first control mode is selected, whether or not the accelerator opening degree θ ACC is equal to or smaller than a predetermined value θ1 is determined at step S113, in order to determine, based on the map shown in FIG. 6, the vane opening degree θ VG which varies in dependence on engine rotation speed Ne and accelerator opening degree θ ACC. If the result of this determination is NO or if it is determined that the accelerator opening degree θ ACC is larger than the predetermined value θ1, the control routine terminates without executing step S115 and subsequent steps. In this case, the vane opening degree θ VG is variably controlled within a range from the value 3 to the value 8 depending on the engine rotation speed Ne, as described above.

On the other hand, if the result of the determination at step S113 is YES or if the accelerator opening degree θ ACC is equal to or less than the predetermined value θ1, the flow proceeds to step S115 in which whether or not the engine rotation speed Ne is equal to or higher than a predetermined value Ne0 (e.g., idling rotation speed) is determined. If it is determined that the engine rotation speed Ne is equal to or higher than the predetermined value Ne0, the flow proceeds to step S117 in which the vane opening degree θ VG is set to the value 8 based on the map shown in FIG. 6.

As a result, when the first control mode is selected, if the engine is operated in a fuel-cut region where the engine rotation speed Ne is equal to or higher than the predetermined value Ne0 and the accelerator opening degree θ ACC is less than a fuel-cut discrimination value θ0 which is smaller than the predetermined value θ1, the engine brake unit 30 is rendered operative and the engine-brake-force generating function of the engine brake unit 30 is assisted by the supercharge at the minimum supercharging degree corresponding to the maximum vane opening degree 8.

On the other hand, if the result of the determination at step S115 is NO or if it is determined that the engine rotation speed Ne is smaller than the predetermined value Ne0 so that the engine is in an idling operation, the flow proceeds to step S119 in which the vane opening degree θ VG is set to the value 3 based on the map shown in FIG. 6, thereby improving the combustion efficiency of fuel for idling rotation and preventing engine stall.

If the result of the determination at step S111 is NO or if it is determined that the first control mode is not selected, the flow proceeds to step S122 in which whether or not the second control mode is selected is determined. If the result of this determination is NO or if the third control mode is selected, in order to determine whether or not the engine 1 is operated in the fuel-cut region, a determination is made at step S114 as to whether or not the accelerator opening degree θ ACC is equal to or smaller than the predetermined value θ0, and a determination is made at step S116 as to whether or not the engine rotation speed Ne is equal to or higher than the predetermined value Ne0.

If the result of the determination at step S116 is YES or if the engine is in the fuel-cut region in which requirements θ ACC≦θ0 and Ne≧Ne0 are satisfied, the flow proceeds to step S118 in which whether or not the engine rotation speed Ne is equal to or higher than the predetermined value Ne1 (e.g., 1900 rpm) is determined. If the result of this determination is NO or if it is determined that the engine rotation speed Ne is smaller than the predetermined value Ne1, it is determined that the engine is operated in a low engine speed rotation zone of the fuel-cut region. The flow proceeds to step S120 in which the vane opening degree θ VG is set to the value 1 based on the map shown in FIG. 7. On the other hand, if the result of the determination at step S120 is YES or if it is determined that the engine rotation speed Ne is equal to or higher than the predetermined value Ne1, the flow proceeds to step S122 in which the vane opening degree θ VG is set to the value 2 based on the map shown in FIG. 7.

That is, in case that the third control mode is selected, when the engine operates in the fuel-cut region, the engine brake unit 30 is actuated as in the case of the second control mode being selected in the first embodiment. At the same time, in dependence on the engine rotation speed Ne, the vane opening degree θ VG is set to the vane opening degree 1 or 2 which is smaller than the minimum vane opening degree 3 attained when the engine brake unit 30 is disabled. As explained with reference to FIG. 9 in the foregoing description as to the first embodiment, by setting the vane opening degree to the value 1 or 2, it is possible to enhance the braking action (more specifically, exhaust brake action of the turbocharger 60 and engine brake action of the engine brake unit 30) of the auxiliary brake system, while preventing excessive rotation of the turbine 66.

If the result of the determination at step S116 is NO, or if it is determined that the engine rotation speed Ne is smaller than the predetermined value Ne0, it is determined that idling operation is being performed. In this case, the flow proceeds to step S34 in which the vane opening degree θ VG is set to the value 3 based on the map shown in FIG. 7, thereby preventing engine stall at the time of idling rotation.

On the other hand, if the result of the determination at step S112 is YES, or if the second control mode, which corresponds to the first control mode in the first embodiment, is selected, the vane opening degree θ VG is set in dependence on the engine rotation speed Ne and the accelerator opening degree θ ACC based on the map shown in FIG. 8.

To this end, at step S126, whether or not the accelerator opening degree θ ACC is equal to or less than the fuel-cut discrimination value θ0 is determined. If the result of this determination is NO, or if it is determined that the accelerator opening degree θ ACC is larger than the predetermined value θ0 and hence the engine is not in the fuel-cut region, the control routine terminates without carrying out step S128 and subsequent steps. On the other hand, if it is determined at step S126 that the accelerator opening degree θ ACC is equal to or less than the predetermined value θ0, the flow proceeds to step S128 in which whether or not the engine rotation speed Ne is equal to or higher than the predetermined value Ne0 is determined, to thereby determine whether the engine is in the fuel-cut region or in the idling region. If the result of this determination is YES, or if the engine is in the fuel-cut region, the flow proceeds to step S130 in which whether or not the engine rotation speed Ne is equal to or higher than the predetermined value Ne1 is determined. If the result of this determination is YES, the flow proceeds to step S124 in which the vane opening degree θ VG is set to the value 3 based on the map shown in FIG.

8. On the other hand, if the result of the determination at step S130 is NO, the flow proceeds to step S132 in which the vane opening degree θ VG is set to the value 2 based on the map shown in FIG. 8.

That is, in case that the second control mode is selected, the engine brake unit 30 is actuated when the engine is in the fuel-cut region, the vane opening degree θ VG is set to the value 2 or 3 depending on the engine rotation speed Ne, as in the case of the first control mode being selected in the first embodiment, whereby the exhaust brake action of the turbocharger 60 and the engine brake action of the engine brake unit 30 are enhanced.

If it is determined at step S128 that the engine is in the idling rotation region in which the engine rotation speed Ne is smaller than the predetermined value Ne0, the flow proceeds to step S34 in which the vane opening degree θ VG is set to the value 3 based on the map shown in FIG. 8, thereby preventing engine stall at the time of the idling rotation.

Figure 13:
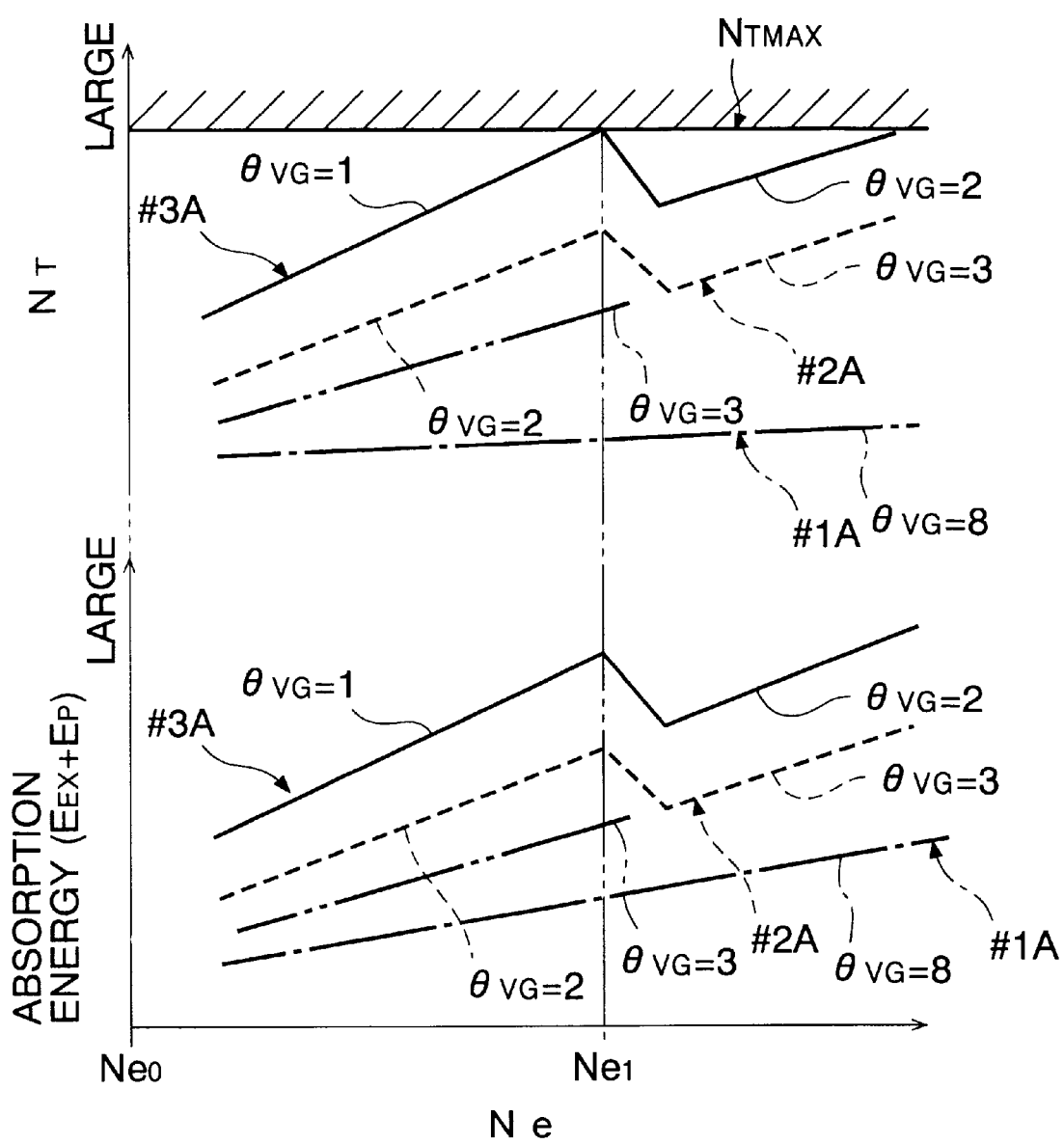
FIG. 13 is a diagram showing, as a function of engine rotation speed Ne, the turbine rotation speed NT and absorption energy at the time of operation of the auxiliary brake system according to the second embodiment.

FIG. 13 shows the operating characteristic of the auxiliary brake system according to this embodiment. Like FIG. 10 showing the operating characteristic of the first embodiment, the characteristic line shown at the upper portion of FIG. 13 indicates a change in the turbine rotation speed NT in the fuel-cut region with the change in the engine rotation speed Ne. The characteristic line shown at the lower portion of FIG. 13 indicates a change in total absorption energy (EEX+EP) absorbed by the auxiliary brake system in the fuel-cut region with the change in the engine rotation speed Ne. EEX and EP indicate absorption energy absorbed by the exhaust brake action of the auxiliary brake system and absorption energy absorbed by the engine brake action, respectively.

When the vane opening degree adjustment (FIG. 12) is carried out in the third control mode (#3A), the vane opening degree θ VG is set to the minimum value 1 in that low engine rotation speed zone of the fuel-cut region in which the accelerator opening degree θ ACC is equal to or less than the fuel-cut discrimination value θ0 and the engine rotation speed Ne changes within a range from the predetermined value Ne0 (idling rotation speed) to the predetermined value Ne1 (e.g., 1900 rpm). In this case, as shown by the solid line in the upper left portion of FIG. 13, the turbine rotation speed NT takes large values throughout the entirety of the engine rotation speed zone where the engine speed varying from Ne0 to Ne1. Therefore, as shown by the solid line in the lower left portion of FIG. 13, the absorption energy (EEX+EP) also takes very large values. In that high engine rotation speed zone of the fuel-cut region in which Ne>Ne1 is satisfied, the vane opening degree θ VG is set to the value 2, so that the turbine rotation speed NT takes large values which do not exceed a limit speed NTMAX. Also, the absorption energy (EEX+EP) takes a large value which is substantially constant, as shown by the solid line in the upper right portion of FIG. 13. Therefore, if the third control mode is selected when the loaded vehicle weight is heavy and the gradient of a descending slope on which the vehicle runs is large, a strong, well responsive braking power can be produced, thereby achieving an improved traveling stability of the vehicle.

In case the vane-opening-degree adjustment is performed in the second control mode (#2A), the vane opening degree θ VG is set to the value 2 when the engine is in the low engine rotation speed zone of the fuel-cut region in which Ne0O<Ne<Ne1 is established. When the engine is in the high engine rotation speed zone of the fuel-cut region in which Ne>Ne1 is established, the vane opening degree θ VG is set to the value 3. Therefore, the turbine rotation speed NT and the absorption energy (EEX+EP) take smaller values than those attained in the third control mode at the same engine rotation speed, as shown by broken lines in upper and lower portions of FIG. 13, respectively. On the other hand, when the engine is in the low engine rotation speed zone of the fuel-cut region, the turbine rotation speed and absorption energy take larger values than those (shown by two-dotted chain lines in the upper left portion and lower left portion of FIG. 13) attained, at the same engine rotation speed, when the vane opening degree is adjusted to the value 3.

In case that the vane opening degree adjustment is carried out in the first control mode (#1A), the vane opening degree θ VG is set to the maximum value 8 throughout the entirety of the fuel-cut region, like when the auxiliary brake system is disabled (FIG. 6). In this case, the turbine rotation speed NT takes small values throughout the entirety of the fuel-cut region, as shown by the one-dotted chain line in the upper portion of FIG. 13. However, as distinct from the case where the auxiliary brake system is disabled, the auxiliary brake system is actuated when the engine is in the fuel-cut region. During the time the auxiliary brake system is actuated, the engine-brake-force generating action of the engine brake unit 30 is exerted. In this case, as shown by the one-dotted chain line in the lower portion of FIG. 13, the absorption energy (EEX+EP) absorbed by the auxiliary brake system becomes larger (the gradient of the characteristic line becomes steeper) than the absorption energy, shown by the one-dotted chain line in the lower portion of FIG. 10, at the time of non-operation of the auxiliary brake system. Therefore, by using the first control mode, e.g., upon vehicle traveling on a flat road, a weak auxiliary brake force can be generated, while improving the durability of the VG turbocharger 60.

As described above, in the auxiliary brake system of this embodiment, the auxiliary brake system is selectively operable by manipulating the switching-operation member 206 depending on a vehicle condition such as loaded vehicle weight and the gradient of descending slope. Further, the vane opening degree control at the time when the auxiliary brake system is in operation can be carried out in any one of the first, second and third control modes selected by the manipulation of the member 206. Therefore, while making the VG turbocharger 60 function excellently as a supercharger in the engine accelerating region, it is possible to enhance the supercharging effect of the VG turbocharger 60 in the fuel-cut region in accordance with the driver's intention, thereby optimizing the engine brake action of the compression-releasing engine brake unit 30. Therefore, it is possible to prevent an excessive engine brake force from being generated opposite to the driver's intention. Further, by suppressing the turbine rotation speed NT except when needed, it is possible to improve the durability of the VG turbocharger 60. Especially, selection of the first control mode in which the vane opening degree θ VG is set to the maximum value 8 makes it possible to obtain a great effect of improving the durability of the turbocharger.

Although the second embodiment is designed to select the first, second or third control mode for the vane opening degree control, four or more control modes may be provided and the vane opening degree control may be made in an arbitrary one control mode selected therefrom. In this case, the turbine rotation speed NT can be adjusted further finely, so that optimization of the auxiliary brake force and improvement of the durability of the VG turbocharger 60 can be achieved.

When the first control mode is selected in the second embodiment, the vane opening degree control is carried out which corresponds to that of the first embodiment performed when the auxiliary brake system is disabled, and when the second or third control mode is selected in the second embodiment, the vane opening degree control is carried out corresponding to that of the first embodiment performed in the first or second control modes. However, the manner of vane opening degree control is not restricted to the above. That is, the number of vane-opening-degree stages in each of the first, second and third control modes and the vane opening degree set in each stage may be different from those corresponding to the first embodiment.

Although the first and second embodiments employ the VG turbocharger capable of changing the vane opening degree, the auxiliary brake system of the present invention may be formed by combining arbitrary types of turbochargers capable of changing the supercharging degree (e.g., flow sectional area at an exhaust inlet of the exhaust brake) with a compression-releasing engine brake unit.

What is claimed is:

1. An auxiliary brake system comprising:
    a turbocharger operable to variably adjust a supercharging degree;
    an engine brake unit for generating an engine brake force by discharging suction air, compressed in a combustion chamber of an internal combustion engine, at timing in the vicinity of compression top dead center of the internal combustion engine;
    a controller for driving said turbocharger, when said engine brake unit is in operation, so as to permit the supercharging degree to become larger than that attained when said engine brake unit is disabled; and
    engine load detecting means for detecting a Load state of the internal combustion engine,
    wherein said engine brake unit is rendered operative when said engine load detecting means detects that a load applied to the internal combustion engine is smaller than a predetermined load indicative of the deceleration of the vehicle.

2. The auxiliary brake system according to claim 1, further comprising:
    engine rotation speed detecting means for detecting an engine rotation speed,
    wherein said controller drives said turbocharger so as to decrease the supercharging degree, within a predetermined range, with increase in the engine rotation speed at the time when said engine brake unit is in operation; and
    wherein said predetermined range is determined such that the supercharging degree which varies within said predetermined range is permitted to have a value larger than an upper limit value of the supercharging degree attained at the time when said engine brake unit is disabled.

3. The auxiliary brake system according to claim 2, wherein said controller drives said turbocharger so as to change the supercharging degree in a stepwise fashion within the predetermined range in accordance with the engine rotation speed at the time when said engine brake unit is in operation.

4. The auxiliary brake system according to claim 1, further comprising:
    a changeover switch adapted to be changed over between a first changeover position at which said turbocharger is allowed to effect a supercharging-degree enhancement action and a second changeover position in which the supercharging-degree enhancement action is prohibited,
    wherein said controller is permitted to drive said turbocharger so as to increase the supercharging degree only when said changeover switch is at the first changeover position.

5. The auxiliary brake system according to claim 4, wherein said engine brake unit is rendered inoperative when said changeover switch is in said second changeover position.

6. The auxiliary brake system according to claim 1, further comprising:
    a changeover switch adapted to be changed over among a plurality of first changeover positions, respectively corresponding to different supercharging degrees, and a second changeover position,
    wherein said controller is operable to drive said turbocharger so that the supercharging degree becomes equal to a value corresponding to a selected first changeover position when any one of the plurality of the first changeover positions is selected by operating said changeover switch; and
    wherein said turbocharger is prevented from effecting a supercharging-degree enhancement action when the changeover switch is at the second changeover position.

7. The auxiliary brake system according to claim 6, wherein said engine brake unit is rendered inoperative when said changeover switch is in said second changeover position.

8. The auxiliary brake system according to claim 1, wherein said turbocharger includes an exhaust turbine driven by exhaust gas discharged from the internal combustion engine, and an exhaust-introduction adjuster for variably adjusting a flow sectional area at an exhaust inlet of said exhaust turbine; and
    wherein said controller operates said exhaust-introduction adjuster to permit the flow sectional area at the exhaust inlet to become smaller than that given when said engine brake unit is disabled, when said engine brake unit is in operation.

9. The auxiliary brake system according to claim 8, wherein said exhaust-introduction adjuster of said turbocharger includes nozzle vanes disposed around said exhaust turbine at intervals for a vane opening degree adjustment, and an actuator for adjusting opening degrees of said nozzle vanes, said exhaust-introduction adjuster being operable to adjust the opening degrees of said nozzle vanes to thereby change a total area of gaps each defined between adjacent ones of said nozzle vanes; and
    wherein said controller drives said actuator to permit the opening degrees of said nozzle vanes to become smaller than those given when said engine brake unit is disabled, when said engine brake unit is in operation.

10. The auxiliary brake system according to claim 9, further comprising:
    engine rotation speed detecting means for detecting an engine rotation speed,
    wherein said controller drives said actuator so as to increase the opening degree of each of said nozzle vanes, within a predetermined range, with increase in the engine rotation speed at the time when said engine brake unit is in operation; and
    wherein said predetermined range is determined such that the opening degree of said each nozzle vane which varies within said predetermined range is permitted to have a value smaller than a lower limit value, attainable at the time when said engine brake unit is disabled, of the flow sectional area at the exhaust inlet.

11. The auxiliary brake system according to claim 10, wherein said controller drives said actuator so as to change the opening degree of said each nozzle vane in a stepwise fashion within the predetermined range in accordance with the engine rotation speed at the time when said engine brake unit is in operation.

12. The auxiliary brake system according to claim 9, further comprising:
a changeover switch adapted to be changed over between a first changeover position at which said actuator is allowed to effect a nozzle-vane-opening-degree increasing action and a second changeover position in which the nozzle-vane-opening-degree increasing action of said actuator is prohibited,
wherein said controller is permitted to drive said actuator so that said actuator effects the nozzle-vane-opening-degree increasing action only when said changeover switch is at the first changeover position.

13. The auxiliary brake system according to claim 9, further comprising:
a changeover switch adapted to be changed over among a plurality of first changeover positions, respectively corresponding to different vane-opening-degree variable ranges, and a second changeover position,
wherein said controller is operable to drive said actuator so that the opening degree of said each nozzle vane changes within the vane-opening-degree variable range corresponding to a selected first changeover position when any one of the plurality of the first changeover positions is selected by operating said changeover switch; and
wherein said actuator is prevented from effecting the vane-opening-degree increasing action when said changeover switch is at the second changeover position.

14. The auxiliary brake system of claim 1 wherein said engine load detecting means comprises a sensor for determining the angular position of an acceleration pedal below a predetermined angle.

15. An auxiliary brake system comprising:
a turbocharger operable to variably adjust a supercharging degree;
an engine brake unit for generating an engine brake force by discharging suction air, compressed in a combustion chamber of an internal combustion engine, at timing in the vicinity of compression top dead center of the internal combustion engine;
a controller for driving said turbocharger, when said engine brake unit is in operation, so as to permit the supercharging degree to become larger than that attained when said engine brake unit is disabled; and
a changeover switch adapted to be changed over among a plurality of first changeover positions, respectively corresponding to different supercharging degrees, and a second changeover position,
wherein said controller is operable to drive said turbocharger so that the supercharging degree becomes equal to a value corresponding to a selected first changeover position when any one of the plurality of the first changeover positions is selected by operating said changeover switch; and
wherein said turbocharger is prevented from effecting a supercharging-degree enhancement action when the changeover switch is at the second changeover position.

16. An auxiliary brake system comprising:
a turbocharger operable to variably adjust a supercharging degree;
an engine brake unit for generating an engine brake force by discharging suction air, compressed in a combustion chamber of an internal combustion engine, at timing in the vicinity of compression top dead center of the internal combustion engine, and
a controller for driving said turbocharger, when said engine brake unit is in operation, so as to permit the supercharging degree to become larger than that attained when said engine brake unit is disabled;
said turbocharger including an exhaust turbine driven by exhaust gas discharged from the internal combustion engine, and an exhaust-introduction adjuster for variably adjusting a flow sectional area at an exhaust inlet of said exhaust turbine;
said controller operating said exhaust-introduction adjuster to permit the flow section area at the exhaust inlet to become smaller than that given when said engine brake unit is disabled, when said engine brake unit is in operation;
said exhaust-introduction adjuster of said turbocharger includes nozzle vanes being disposed around said exhaust turbine at intervals for a vane opening degree adjustment;
an actuator for adjusting opening degrees of said nozzle vanes, said exhaust-introduction adjuster being operable to adjust the opening degrees of said nozzle vanes to thereby change a total area of gaps each defined between adjacent ones of said nozzle vanes;
said controller driving said actuator to permit the opening degrees of said nozzle vanes to become smaller than those given when said engine brake unit is disabled, when said engine brake unit is in operation;
a changeover switch adapted to be changed over among a plurality of first changeover positions, respectively corresponding to different vane-opening-degree variable ranges, and a second changeover position,
wherein said controller is operable to drive said actuator so that the opening degree of said each nozzle vane changes within the vane-opening-degree variable range corresponding Lo a selected first changeover position when any one of the plurality of the first changeover positions is selected by operating said changeover switch; and
wherein said actuator is prevented from effecting the vane-opening-degree increasing action when said changeover switch is at the second changeover position.

* * * * *